United States Patent [19]

Shiota et al.

[11] Patent Number: 5,811,504
[45] Date of Patent: Sep. 22, 1998

[54] LIQUID CRYSTALLINE EPOXY MONOMER AND LIQUID CRYSTALLINE EPOXY RESIN CONTAINING MESOGEN TWINS

[75] Inventors: Atsushi Shiota; Christopher K. Ober, both of Ithaca, N.Y.

[73] Assignee: Cornell Research Foundation, Inc., Ithaca, N.Y.

[21] Appl. No.: 510,867

[22] Filed: Aug. 3, 1995

[51] Int. Cl.[6] .......................... C08G 59/06; C08G 59/40; C08G 59/46
[52] U.S. Cl. .............................. 528/27; 528/98; 528/100; 528/110; 528/407; 525/523; 549/215; 549/551; 549/556; 549/560
[58] Field of Search ............................... 528/27, 98, 100, 528/110, 407; 525/523; 549/560, 551, 556, 215

[56] References Cited

U.S. PATENT DOCUMENTS 5,270,404 12/1993 Earls et al. ............................... 525/481

*Primary Examiner*—Frederick Krass
*Attorney, Agent, or Firm*—Oblon, Spivak, McClelland, Maier & Neustadt, P.C.

[57] ABSTRACT

Monomers of formula (I)

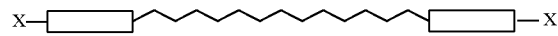

where

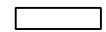

is a mesogen,

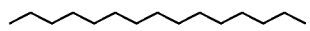

is a spacer, and —X is a group having an epoxy function exhibit a reduced tendency to undergo self-condensation via addition polymerization and afford liquid crystalline polymers upon condensation with a crosslinking agent.

19 Claims, 11 Drawing Sheets

LIQUID CRYSTALLINE EPOXY MONOMER AND LIQUID CRYSTALLINE EPOXY RESIN CONTAINING MESOGEN TWINS

BACKGROUND OF THE INVENTION

1. Field of the Invention

The present invention relates to anisotropic curable monomers and in particular to anisotropic diepoxy compounds. The present invention also relates to liquid crystalline thermoset polymers prepared from such a monomer.

2. Description of the Background

Anisotropic heat-curable monomers are known which can be cured to form anisotropic thermoset resins. It is known to those skilled in the art that anisotropic thermoset resins, frequently processed from "liquid crystalline" polymers or monomers, have desirable self-reinforcing characteristics. U.S. Pat. Nos. 4,440,945, 4,452,993 and 4,514,553 (issued to Conciatori et al) and U.S. Pat. No. 4,683,327 (issued to Stackman) disclose anisotropic heat-curable acetylene-terminated and acrylic-terminated monomers which can be formed into self-reinforcing thermoset resins as a result of molecular orientation in the cross-linked resin. However, the tendency of these monomers to self-condense via addition polymerization precludes copolymerization with other monomers which are not acetylene-terminated or acrylic-terminated. U.S. Pat. No. 4,654,412 (issued to Calundann et al) discloses base anisotropic polyesters containing stilbene or tolan functionalities which are copolymerized by the addition of comonomers ("curing agents") such as maleic anhydride to form anisotropic thermoset resins. The principal of copolymerization per se allows for the preparation of a vastly larger number of advantageous variations from the base anisotropic resin, but the temperatures and viscosities of the base resins are disadvantageously high.

The construction of densely crosslinked networks from liquid crystalline (LC) monomers is being studied as a means of preparing new material with unusual mechanical and optical properties (Broer et al, *Angew. Makromol. Chem.*, vol. 183, 45 (1990); Broer et al, *Macromolecules*, vol. 23, 2474 (1990); Broer et al *Polym. Eng. Sci.*, vol. 31(9), 625 (1991); Lin et al, *Polymer Communications*, January 1994; Earls et al, EP 379,057; Barclay et al, *Prog. Polym. Sci.*, vol. 18, 899–945 (1993)). In addition to these goals, LC thermosets offer the possibility of producing bulk layered structures with macroscopic orientation if cured in an aligning field. Such new materials provide interesting possibilities as separation or transport media as well as being large dimension analogs to Langmuir-Blodgett films provided that smectic-like order can be formed in the network.

Most monomers studied to-date contain the crosslinking site directly attached to the mesogenic group (see FIG. 3a). Interest in these thermosets has been as structural materials with superior fracture and modulus properties. Most studies have shown that mesophase retention in the network occurs. At least one study has reported the formation of LC networks from rigid-rod non-LC monomers. However, most networks cured with a second component which was itself non-LC have displayed a nematic phase. Several materials have been constructed with a spacer between the crosslinking site and mesogenic group (see FIG. 3b). These latter materials have been largely used as optical filters for light polarization among a number of applications (Hikmet, *Macromolecules*, vol. 25, 5759 (1992)). Interest has focused on the synthesis of new mesomorphic materials with an incidental interest in the type of mesophase that is produced except in the case of optical materials where a nematic phase is desired.

Earlier studies involving LC epoxies built from dihydroxy-α-methyl stilbene units showed that if thermosets with a narrow MW distribution were crosslinked with diamines, then smectic-like networks were formed (Barclay et al, *J. Polym. Sci.: Poly. Chem. Ed.*, vol. 30, 1831–1843 (1992)). It appeared that network formation induced registration between the mesogenic groups that was absent in the unpolymerized melt and transformed the LC organization from nematic to smectic. Such fixed orientation above Tg is unusual in ordered materials in view of the many sub-Tg relaxations that may occur in highly oriented polymers such as those studied for NLO applications (Hampsch et al, *Macromolecules*, vol. 23, 3640–3647 (1990)).

Several research groups have studied LC twins over the last few years as novel analogs to LC polymers (Chien et al, *Macromolecules*, vol. 20, 2340–2344 (1987)), but also because of their unique LC behavior (Attard et al, *Liquid Crystals*, vol. 16, 529–581 (1994)). Twins consist of two mesogenic groups linked by a flexible spacer. A variety of connecting structures have been used, but these have been largely limited to short alkyl segments or siloxanes (Griffin et al, *J. Am. Chem. Soc.*, vol. 107, 2975–2976 (1985); Diaz et al, *Liquid Crystals*, vol. 16, 105–113 (1994)). The alkyl spacer imposes the even-odd behavior in the melting and mesophase behavior usually associated with semi-flexible LC polymers. Most reported twins have consisted of symmetrical structures and had classical mesophase sequences, but among those that are asymmetric, recently a chiral twin has been reported with unusual incommensurate mesophases (Hardouin et al, *J. Phys. II France*, vol. 4, 627–643 (1994)). Melt rheology of some twin structures has shown a marked aggregation of the mesogens which can lead to an elastomer-like behavior (Lin et al, *Macromolecules*, vol. 21, 2014–2018 (1988)). A variety of phases are possible and the resulting organization of these structures can be quite complex involving interdigitation of smectic layers.

Thus, there remains a need for liquid crystalline thermosetting monomers which db not suffer from these disadvantages. There also remains a need for liquid crystalline thermoset polymers prepared from such monomers.

SUMMARY OF THE INVENTION

Accordingly, it is one object of the present invention to provide novel liquid crystalline thermosetting monomers.

It is another object of the present invention to provide novel liquid crystalline thermosetting monomers which exhibit a reduced tendency to undergo self condensation.

It is another object of the present invention to provide novel liquid crystalline thermosetting monomers which have a good storage life and good stability.

It is another object of the present invention to provide novel liquid crystalline thermoset polymers prepared from such monomers.

It is another object of the present invention to provide novel smectic networks schematically shown in FIG. 3c prepared by curing such monomers with a crosslinking agent.

These and other objects, which will become apparent during the following detailed description, have been achieved by the inventors' discovery that liquid crystalline monomer twins which contain two mesogenic groups linked by a flexible spacer and have an epoxy group attached to each mesogen allow for crosslinking and the formation of polymeric structures.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Thus, in a first embodiment, the present invention provides liquid crystalline epoxy monomers which form a smectic-like network structure when crosslinked and have the formula (I):

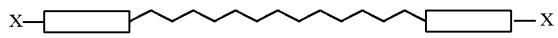

where

is a mesogen,

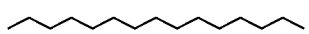

is a spacer, and —X is a group having an epoxy function.

Mesogens useful in the present invention include those described in *Liquid Crystals in Tabellen II*, D. Demus et al Eds., VEB Deutscher Verlag für Grundstoffindustrie, Leipzig, 1984, which is incorporated herein by reference. Examples include mesogens based on phenol benzoate, biphenyl, stilbene, diazobenzene, anilinebenzylidene, and derivatives thereof.

Preferred mesogens include:

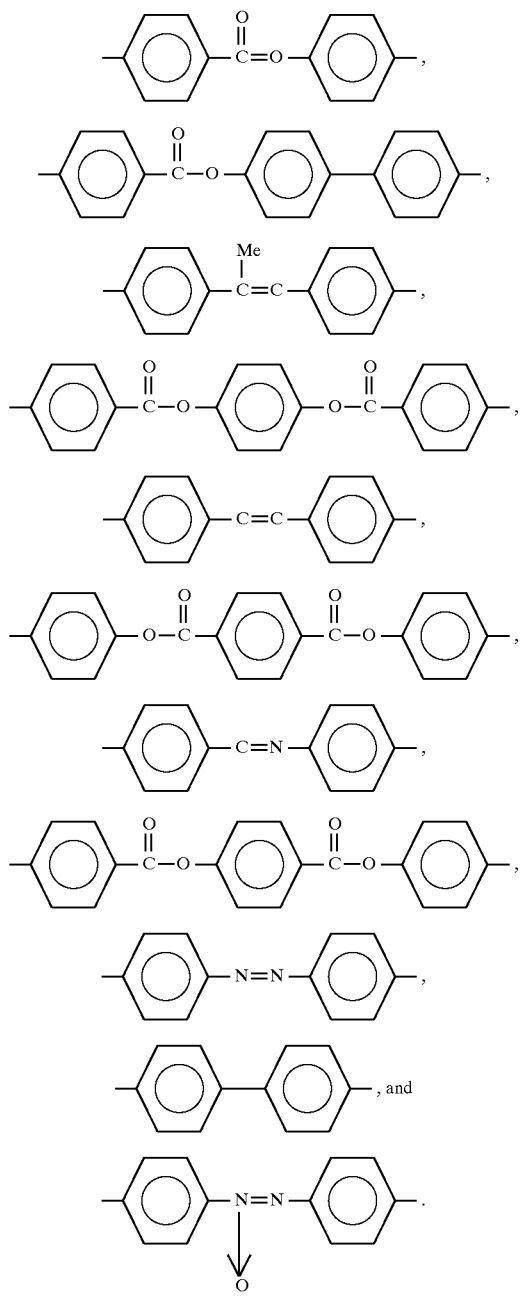

Different mesogens can be used in the same twin.

Spacers useful in the invention include $C_2$–$C_{22}$ alkylene groups optionally interrupted by one or more nonadjacent heteroatoms and poly(di-$C_{1-4}$-alkylsiloxane) chains having 2 to 20 repeating units. Preferred spacers include:

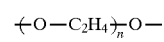

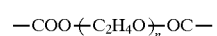

-continued

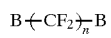

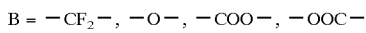

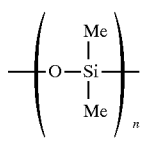

n=2–20.

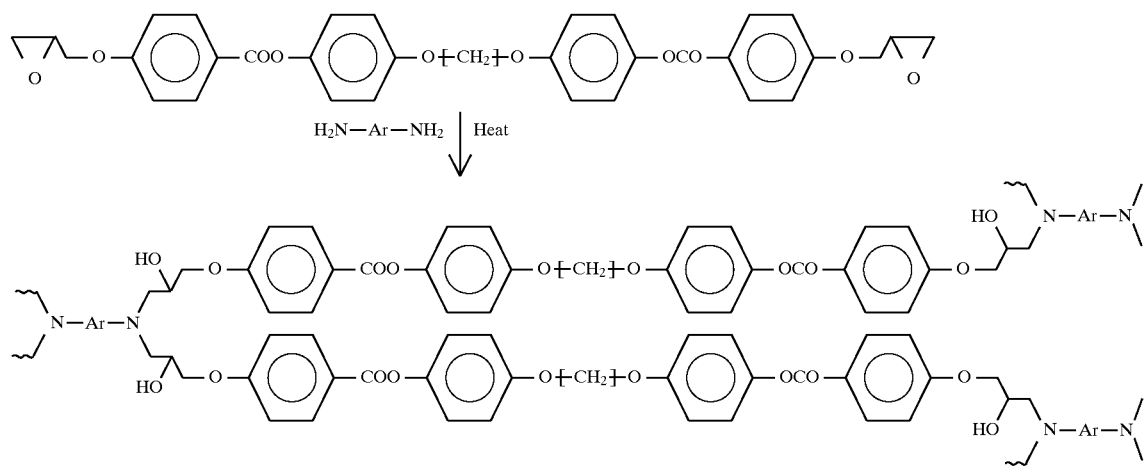

Suitable epoxy groups bonded to mesogens include:

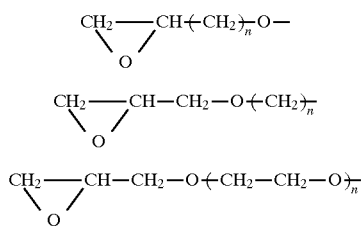

n=1–10.

Figure 1:
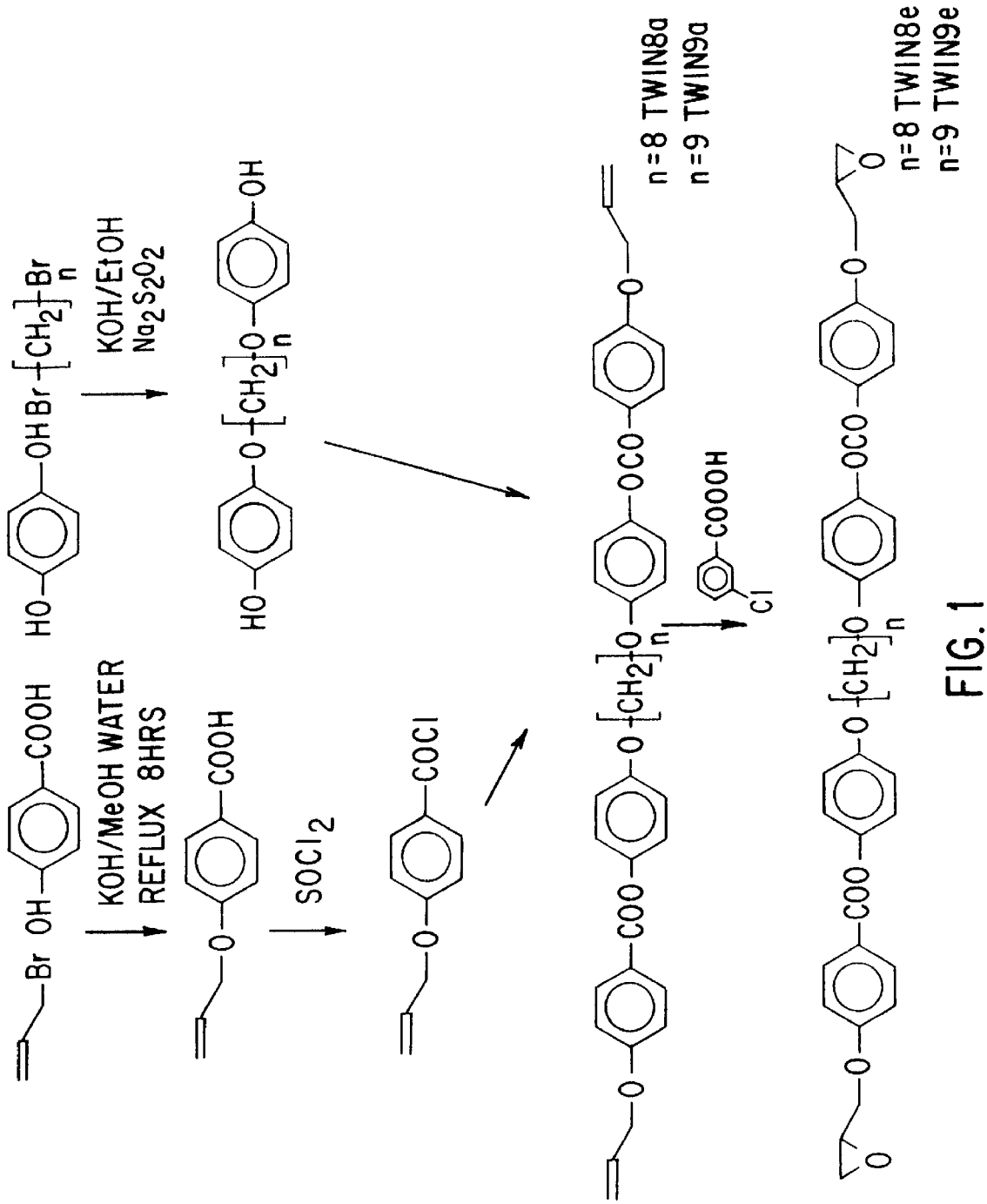
FIG. 1 shows a synthetic scheme for preparing epoxy monomers Twin 8e and Twin 9e containing two phenylbenzoate mesogens.
Figure 2:
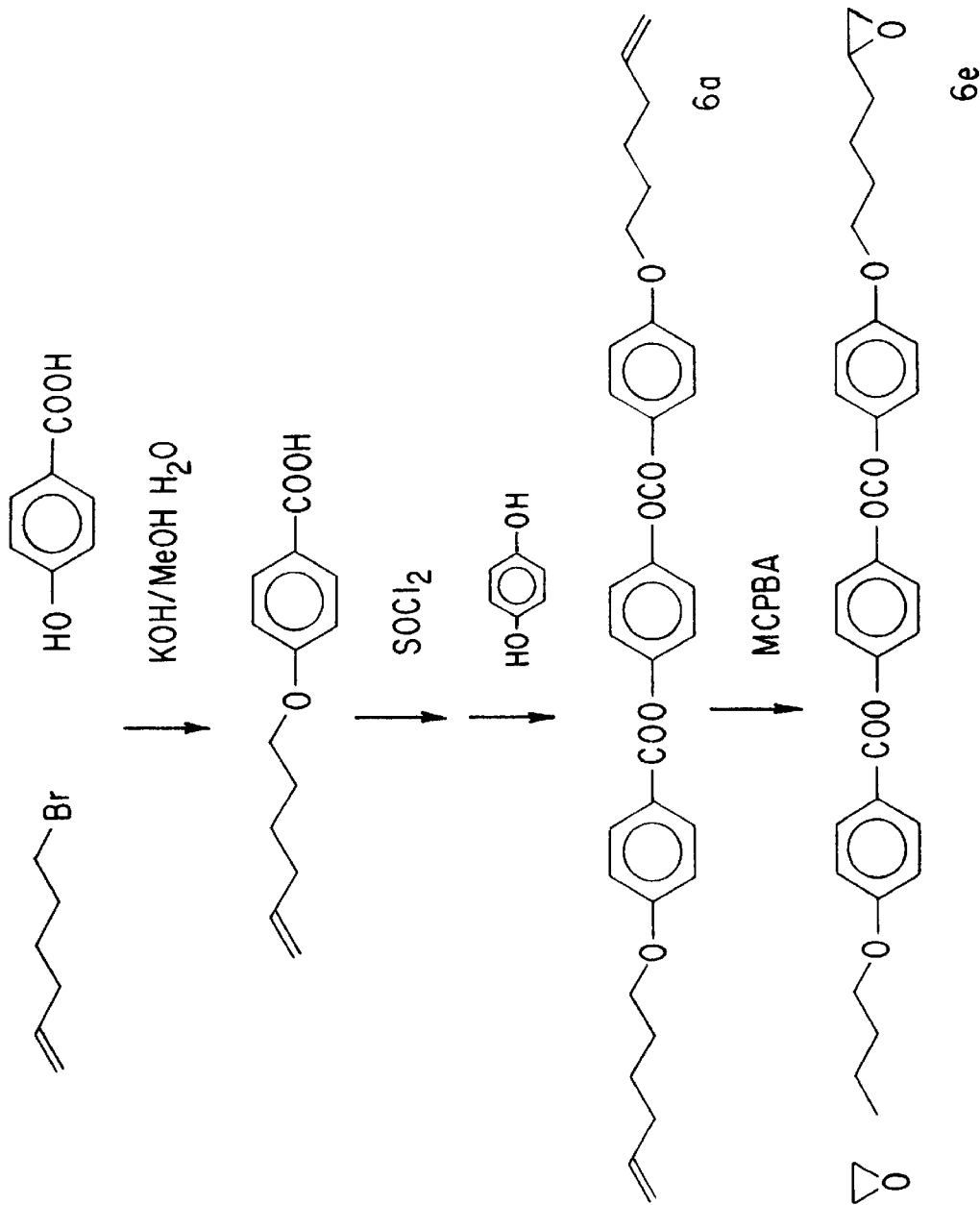
FIG. 2 shows a synthetic scheme for preparing epoxy monomer 6e containing a 1,4-dibenzoyloxybenene mesogen.
Figure 3C:
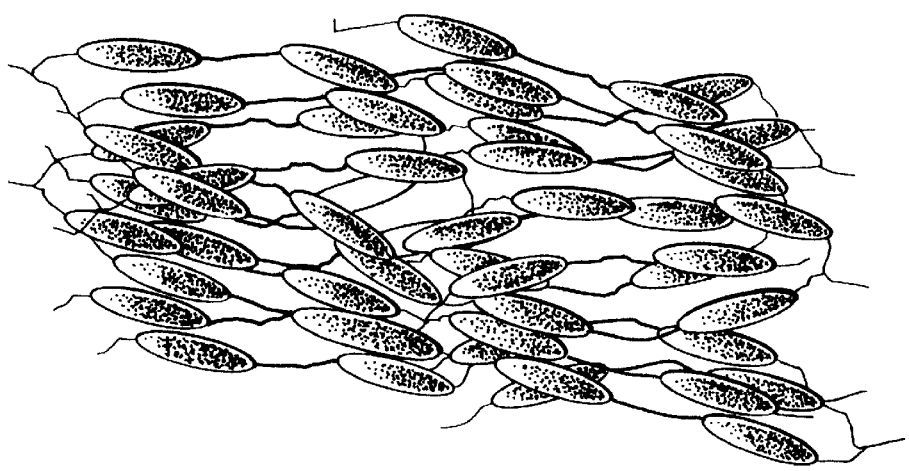
FIGS. 3a–c are schematic images of LC network types built from liquid crystalline monomers of different architectures.
Figure 3B:
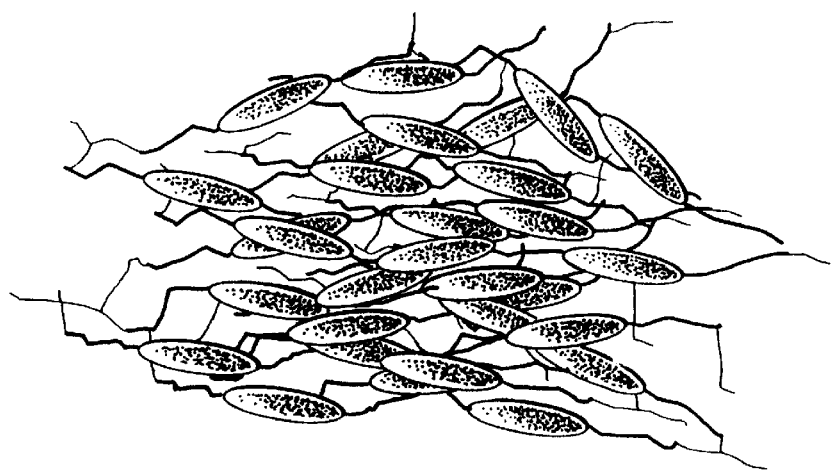
Figure 3A:
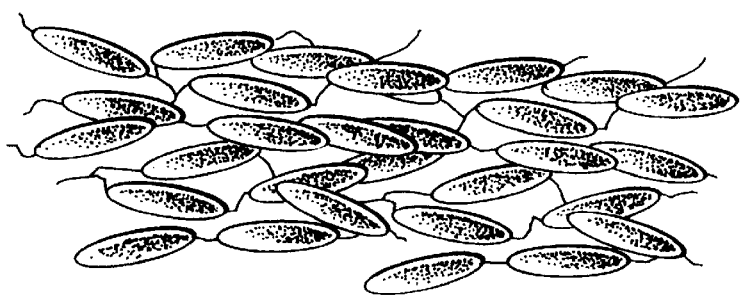

The monomers of formula (I) can be prepared using conventional synthetic techniques. For example, the synthesis of Twin 8e and Twin 9e are shown schematically in FIG. 1. The synthesis of the present monomer containing other mesogens and spacers can be accomplished by modification of the synthetic scheme shown in FIG. 1. For example, replacement of $Br(CH_2)_nBr$ with $Cl-SiMe_2(OSiMe_2)_nCl$ will afford the monomer with a poly(dimethylsiloxane) spacer. Synthetic methods for preparing mesogens with siloxane spacers are described in Diaz et al, *Liquid Crystals*, vol. 16, pp. 105–113 (1994), which is incorporated herein by reference. Synthetic methods useful for preparing asymmetric twin LC compounds can be found in G. S. Attard et al, *Liquid Crystals*, vol. 7, pp. 495–508 (1990), which is incorporated herein by reference.

The monomers of formula (I) may be condensed via polymerization to afford liquid crystalline thermoset polymers by reacting the monomer with any suitable curing agent. The present diepoxy monomers may be polymerized cationically using an acid such as $AlCl_3$, $SnCl_4$, $TiCl_4$, $BF_3$, $PCl_5$, and $SbF_5$. Likewise epoxy compounds can be polymerized anionically by ammonium salts, for example, tetrabutylammonium bromide, dimethyldibenzylammonium chloride, etc.

To form a smectic network, the crosslinking agent should have an effective functionality greater than two. A functionality of at least three is required to obtain a network. Suitable crosslinkers include amine compounds and acid anhydride compounds. Diamine compounds work as tetrafunctional crosslinking agents and acid anhydrides work as both bifunctional and multifunctional crosslinking agents. The formation of a network using a diamine compound is shown schematically below:

Preferred crosslinkers include diamine compounds and diamine/monamine mixtures. More preferred crosslinkers include diamine compounds, especially aromatic diamines such as p-phenylene diamine, 4,4'-diaminodiphenylmethane, 4,4'-diaminobiphenyl, Epikure 1061 (Shell Resin Co., USA), and sulfanilamide.

Typically, a molar ratio of 1 mole of liquid crystalline epoxy monomer to 0.8–1.4 mole of diamine compound is used. A portion of the diamine compound may be replaced with a monamine compound, i.e., up to 33 mole % of the diamine compound may be replaced with a monamine compound. The molar quantity of the monamine is twice that of the diamine compound replaced.

The curing time and temperature will depend on the melting point and reactivity of the epoxy monomer and curing agent. However, the curing reaction is conveniently carried out at a temperature of from room temperature to 200° C. for a time of 1 minute to 24 hours. The curing is usually carried out without a solvent.

Other features of the invention will become apparent in the course of the following descriptions of exemplary embodiments which are given for illustration of the invention and are not intended to be limiting thereof.

EXAMPLES

Synthesis of 4-(2-Propenyloxy)benzoyl Chloride 4-(2-Propenyloxy)benzoic acid was synthesized by Apfel's method (Apfel et al, *Anal. Chem.*, 1985, 57, 651–658). A 1 L three-neck round-bottom flask was equipped with a condenser, 150 mL additional funnel, heating bath, and magnetic stirrer. 90 g (0.65 mol) of 4-hydroxybenzoic acid and 400 mL of methanol were added at 25° C. and stirred. After the acid was dissolved, 105 g (1.9 mol) of potassium hydroxide in 125 mL of distilled water was added dropwise. The reaction mixture was heated to reflux, and 90 g (0.74 mol) of allyl bromide was then added over a 2 hour period. The reaction mixture was allowed to reflux for 8 hours. As the reaction proceeded, potassium bromide precipitated. From this mixture, 250 mL of methanol was removed by evaporation. The remainder of the reaction mixture was cooled to 25° C. and then added to 2.5 L of distilled water. Hexane (250 mL) was added to extract organic impurities. After discarding the organic phase, the aqueous phase was heated to 40° C. and neutralized with 300 mL of 20% HCl. The crude product precipitated during the neutralization, was subsequently collected by filtration and purified by recrystallization from ethanol. Yield: 46 g (40.2%), mp 165° C.

The 4-(2-propenyloxy)benzoic acid, 5 g (0.028 mol), was refluxed with thionyl chloride (37 mL, 0.51 mol) and several drops of pyridine for 8 hours. The excess thionyl chloride was removed in vacuo leaving 4-(2-propenyloxy)benzoyl chloride as a yellow liquid at 25° C. This acid chloride was used without further purification.

Synthesis of 4,4'-(α,ω-Alkanediylbis(oxy))bisphenol 200 mL of 95% ethanol was placed in a 1 L three-necked flask and was deaerated by Ar flow and then maintained under constant Ar pressure. To this was added 0.2 g of sodium hydrosulfite followed by addition of 100 g (1 mol) of hydroquinone. After 0.1 mol of α,ω-dibromoalkane was added, the solution was refluxed while stirring. Then, a solution of potassium hydroxide (0–30 mol/16.8 g) dissolved in 100 mL of 95% ethanol was added over a period of 1 hour. The mixture was refluxed for 8 hours, cooled to 25° C. and acidified with 30 wt % sulfuric acid. To this, 500 mL of 95% ethanol was added. The solid residue which contained some alcohol-insoluble monoalkylated hydroquinone and dialkylated hydroquinone, was filtered off, and washed with two 150 mL portions of hot ethanol in order to remove the remaining 4,4'-α,ω-alkanediyl-bis(oxy)) bisphenol. The filtrates were combined and evaporated, and the residual solid was washed with 1 L of distilled water 3 times. After air drying, the 4,4'-α,ω-alkanediylbis(oxy)) bisphenol was stirred with petroleum ether to remove any unreacted α,ω-dibromoalkane, filtered, air dried, and recrystallized from 20/80 water/95% ethanol mixed solvent. The yield of 4,4'-(1,8-octanediylbis(oxy))bisphenol was 60.7% while the yield 4,4'-(1,9-nonanediylbis(oxy))bisphenol was 55.8%. $^1$H-NMR (THF-d8, 23° C.) for 4,4'-(1,8-octanedlylbis(oxy))bisphenol: δ 6.7 (8 H, d, aromatic), 3.8–3.9 (4H, t, CH$_2$ octyl), 1.7–1.8 (4H, m, CH$_2$ octyl), 1.3–1.5 (8H, in, CH$_2$ octyl).

Synthesis of 4-(2-Propenyloxy)benzoic Acid 4,4'-[1,8-Octanediylbis(oxy)] bisphenol Ester, Twin 8a 0.013 mol of 4,4'-[1,8-octanediylbis(oxy)]bisphenol was dissolved in 50 mL of pyridine. To 0.028 mol of 4-(2-propenyloxy)benzoic chloride, the 4,4'-(α,ω-alkanediylbis (oxy))bisphenol solution was added over a 1 hour period during which the reactor was cooled with ice water. The solution was stirred for 4 hours at room temperature. The reaction mixture was poured into 1 L of water, and the solid product was collected by suction filtration. The solid was twice washed with 1 L of water and dried. The product was purified by recrystallization from pyridine solution. The purified products were crystal platelets. Yield: 65.7%. DSC and POM showed that Twin 8a was nematic, K 146° C. N 179° C. I. $^1$H-NMR (CDCl$_3$, 23° C.): δ 8.2 (4H, d, aromatic), 6.8–7.2 (12H, m, aromatic), 6.1 (2H, m, CH allyl), 5.3–5.5 (4H, m, CH$_2$ allyl), 4.6 (4H, d, CH$_2$ allyl), 4.0 (4H, t, CH$_2$ octyl), 1.7–1.8 (4H, m, CH$_2$ octyl), 1.3–1.6 (8H, m CH$_2$ octyl).

Synthesis of 4-(2-Propenyloxy)benzoic Acid 4,4'-[1,9-Nonanediylbis(oxy) ]bisphenol Ester, Twin 9a Twin 9a was prepared in a manner analogous to Twin 8a, but with recrystallization from tetrahydrofuran. Yield: 54.3%. DSC and POM showed that Twin 9a was nematic, K 100° C. N 150 I. $^1$H-NMR (CDCl$_3$, 23° C.): δ 8.2 (4H, d, aromatic), 6.8–7.2 (12H, m, aromatic), 6.1 (2H, m, CH allyl), 5.3–5.5 (4H, m, CH$_2$ allyl), 4.6 (4H, d, CH$_2$ allyl), 4.0 (4H, t, CH$_2$ nonyl), 1.7–1.8 (4H, m, CH$_2$ nonyl), 1.3–1.6 (10H, in, CH$_2$ nonyl).

Synthesis of 4-(Oxiranylmethoxy)benzoic Acid 4,4'-[1,8-Octanediylbis(oxy)] bisphenol Ester, Twin 8e A 1 L three neck flask equipped with a stirrer, thermometer, condenser and 200 mL additional funnel was charged with 10 g (0.0154 mol) of Twin 8a and 400 mL of chloroform. The stirrer was started, and the temperature was raised to 50° C. 15.93 g (0.0924 mol) of 3-chloroperbenzoic acid (MCPBA) was dissolved in 150 mL of chloroform and added dropwise over a 30 minute period to the Twin 8a solution. The solution was stirred for 72 hours at 50° C. and then washed with 500 mL of 5% sodium bisulfite to destroy residual peracid, and next with 500 mL of 2.5% sodium bicarbonate to extract 3-chlorobenzoic acid. Finally, it was washed with 500 mL of saturated aqueous sodium chloride and then dried over magnesium sulfite. The solvent was removed under reduced pressure to yield a pale yellow solid. The solid was recrystallized from 200 mL of 90/10 chloroform/tetrahydrofuran to yield 7.81 g of white crystals after vacuum drying. $^1$H-NMR (CDCl$_3$, 23° C.): δ 8.1 (4H, d, aromatic), 6.9–7.1 (12H, m, aromatic), 4.3–4.4 (2H, d, CH glycidyl), 4.0–4.1 (2H, d, CH glycidyl), 3.9–4.0 (4H, m, CH$_2$ octyl), 3.3–3.4 (2H, CH$_2$ glycidyl), 2.9–3.0 (2H t, CH glycidyl), 2.8 (2H, t, CH glycidyl), 1.7–1.9 (4H, m, CH$_2$ octyl), 1.3–1.6 (8H, m, CH$_2$ octyl).

Synthesis of 4-(Oxiranylmethoxy)benzoic acid 4,4'-[1,9-Nonanediylbis(oxy)] bisphenol Ester, Twin 9e A 500 mL three neck flask equipped with a stirrer, thermometer, condenser and 200 mL additional funnel was charged with 10 g (0.0151 mol) of Twin 9a and 100 mL of dichloromethane. The stirrer was started, and the temperature was lowered to 0° C. with an ice bath. 15.59 g (0.0904 mol) of MCPBA was dissolved in 150 mL of dichloromethane and added dropwise over a 30 minute period to the Twin 9a solution. The solution was allowed to warm to room temperature. Stirring continued for 12 hours at room temperature. During the reaction, a precipitate (3-chlorobenzoic acid) formed. The reaction mixture was filtered and the filtrate was washed with 500 mL of 5% sodium bisulfite to destroy residual peracid, and next with 500 mL of 2.5% sodium bicarbonate to extract 3-chlorobenzoic acid. Finally, it was washed with 500 mL of saturated aqueous sodium chloride and then dried over magnesium sulfite. The solvent was removed under reduced pressure to yield a pale yellow solid. The solid was recrystallized from 200 mL of 70/30 ethyl acetate/2-propanol to yield after vacuum drying 6.98 g of white crystals. $^1$HNMR (CDCl$_3$, 23° C.): δ 8.1 (4H, d, aromatic), 6.9–7.1 (12H, m, aromatic), 4.3–4.4 (2H, d, CH glycidyl), 4.0–4.1 (2H, d, CH glycidyl), 3.9–4.0 (4H, m, CH$_2$ octyl), 3.3–3.4 (2H, m, CH$_2$ glycidyl), 2.9–3.0 (2H, t, CH glycidyl), 2.8 (2H, t, CH glycidyl), 1.7–1.9 (4H, m, CH$_2$ octyl), 1.3–1.6 (8H, m, CH$_2$ octyl).

Synthesis of 4-(5-Hexenyloxy)benzoyl Chloride

A 500 mL three-neck round-bottom flask was equipped with a reflux condenser, 50 mL additional funnel, heating bath and magnetic stirrer. 12.4 g (0.09 mol) of 4-hydroxybenzoic acid and 100 mL of methanol at 25° C.

were added and stirred. After the acid was dissolved 14 g (0.23 mol) of potassium hydroxide in 25 mL of distilled water was added dropwise. The reaction was heated to reflux followed by adding 15 g (0.09 mol) of 6-bromo-1-hexene over a 2 hour period. The reaction mixture was allowed to reflux for 12 hours. As the reaction proceeded, potassium bromide precipitated. From this mixture, 100 mL of methanol was removed by evaporation. The remainder of the reaction mixture was cooled to 25° C. and then added to 2.0 L of distilled water. 100 mL of petroleum ether was added to extract organic impurities. After discarding the organic phase, the aqueous phase was heated to 40° C. and neutralized with 300 mL of 20% HCl. The crude product precipitated during the neutralization and was subsequently collected by filtration and purified by recrystallization from ethanol. Yield: 10.1 g (49.9%).

The 4-(5-hexenyloxy)benzoic acid 10 g (0.046 mol) was reflux with thionyl chloride (5.4 mL, 0.069 mol) and several drops of pyridine for 8 hours. The excess thionyl chloride was removed in vacuo leaving 4-(5-hexenyl-oxy)benzoyl chloride as a clear liquid at 25° C. This acid chloride was used without further purification.

Synthesis of 4-(5-Hexenyloxy)benzoic Acid 1,4-Phenylene Ester 6a 2.52 g (0.023 mol) of hydroquinone was dissolved in 30 mL of pyridine under a nitrogen atmosphere. A 500 mL three neck flask was placed in 0.028 mol of 4-(5-hexenyloxy) benzoyl chloride under nitrogen atmosphere; the hydroquinone solution was then added over a 1 hour period during which the reactor was cooled with ice water. The solution was then stirred for 8 hours at room temperature. The reaction mixture was poured into 1 L of water, and the solid product was collected by suction filtration. The solid was twice washed with 1 L of water and then dried. The product was purified by recrystallization from 70/30 ethyl acetate/2-propanol. The purified products were platelet crystals. Yield: 40.0%. DSC and POM showed that 6a was nematic, K 133° C. N 205° C. I. $^1$H-NMR (CDCl$_3$, 23° C.): δ 8.1 (4H, d, aromatic), 7.2 (4H, s, aromatic), 6.9–7.0 (4H, d, aromatic), 5.7–6.0 (2H, m, CH vinyl), 4.9–5.1 (2H, t, CH$_2$ vinyl), 4.0–4.1 (4H, t, CH$_2$ butyl), 2.1–2.2 (4H, m, CH$_2$ butyl), 1,8–1.9 (4H, m, CH$_2$ butyl), 1.5–1.7 (4H, m, CH$_2$ butyl).

Synthesis of 4-(4-Oxiranylbutoxy)benzoic Acid 1,4-Phenylene Ester 6e 6e was prepared in a manner analogous to Twin 9e but with recrystallization from ethyl acetate. Yield: 78.6%. $^1$H-NMR (CDCl$_3$ 23° C.): δ 8.1 (4H, d, aromatic), 7.2 (4H, s, aromatic), 6.9–7.0 (4H, d, aromatic), 4.0–4.1 (4H, t, CH$_2$ butyl), 2.9–3.0 (2H, m, CH epoxy), 2.7–2.8 (2H, t, CH epoxy), 2.5 (2H, m, CH epoxy), 1.8–2.0 (4H, m, CH$_2$ butyl), 1.4–1.8 (8H, m, CH$_2$ butyl).

Curing of Diepoxy Monomers Twin 8e, Twin 9e and 6e

Diaminodiphenylmethane (DDM), sulphanilamide (SAA), p-phenylene diamine (PDA) and hexamethylene diamine (HMDA) were used as curing agents. Stoichiometric amounts of the diepoxy monomer and curing agent were ground in a mortar and pestle to produce the reactant mixture. Primary curing experiments on each reactant mixture were investigated with DSC and POM to determine the best curing condition.

Characterization

The structure of the monomers was determined using a Varian XL-200 $^1$H-NMR. Thermal transition temperatures were obtained with a DuPont 950 differential scanning calorimeter (DSC) using a heating and cooling rate of 10° C./min. Liquid crystal mesophases were examined using a Nikon polarizing optical microscope (POM) OPTIPHOT2-POL at 100× and 200× magnification equipped with a Mettler FP-82HF hostage and a Nikon FX-35DX 35 mm camera. Wide angle x-ray diffraction (WAXD) patterns were obtained with nickel filtered copper Kα radiation using an evacuated flat plate camera with pin hole collimation. The X-ray source was a Scintag generator operated at 45 kV and 40 mA. A nominal sample to film distance in the camera of 5 cm and 16.5 cm, and exposure times of 12 hours were typical.

Time-resolved X-ray diffraction data were obtained at the Cornell High Energy Synchrotron Source (CHESS) facilities at Cornell University. Sample temperature was regulated using a Mettler FP-82HF Hostage mounted in the beam path. The diffracted intensity of a monochromated beam of 0.908 Å was recorded with a home-built CCD detector capable of 1 second time resolution.

Molecular geometry calculation

Molecular geometry of the monomers was estimated using MOPAC Ver. 6.0 programmed by J. J. P. Stewart. Keywords of PM3, SYMMETRY and XYZ were selected for the calculation. MOPAC was compiled for a HP-UX 8.0 operating system working on a Hewlett-Packard HP-Apollo 9000 series 720 workstation.

Thermal Behavior of the Epoxy Monomers

Thermal properties were studied using DSC and polarized light optical microscopy (POM). Transition temperatures of the epoxy monomers Twin 8e, Twin 9e, and 6e are shown in Table 1. All three epoxy monomers showed only a nematic mesophase. Schlieren textures were observed in Twin 8e and Twin 9e. On the other hand, a marble texture was observed in 6e. The same textures were observed for the respective diallyl precursors for Twin 8e, Twin 9e or 6e.

The presence of polar epoxy groups on Twin 8e and Twin 9e increased the stability of the crystalline phase relative to their respective precursor, Twin 8a and Twin 9a. Consequently, the melting points of Twin 8e or Twin 9e became higher than their precursors, but the clearing temperatures were almost unchanged. In contrast to the twin epoxy monomers, the existence of epoxy end groups on 6e had a small positive effect on LC phase stability when compared to its precursor, 6a.

TABLE 1

Thermal Properties of epoxy monomers and precursors

|  | $T_m$(°C.) | $\Delta H_m$(kJ/mol) | $T_{NI}$(°C.) | $\Delta H_{NI}$(kJ/mol) |
|---|---|---|---|---|
| Twin 8a | 146 | 182 | 179 | 21 |
| Twin 8e | 152 | 151 | 182 | 18 |
| Twin 9a | 100 | 116 | 149 | 9.4 |
| Twin 9e | 127 | 196 | 149 | 8.5 |
| 6a | 133 | 113 | 206 | 5.5 |
| 6e | 124 | 90.4 | 210 | 5.1 |

Reactivity of Epoxy Twin 8e with Amines

Figure 4:
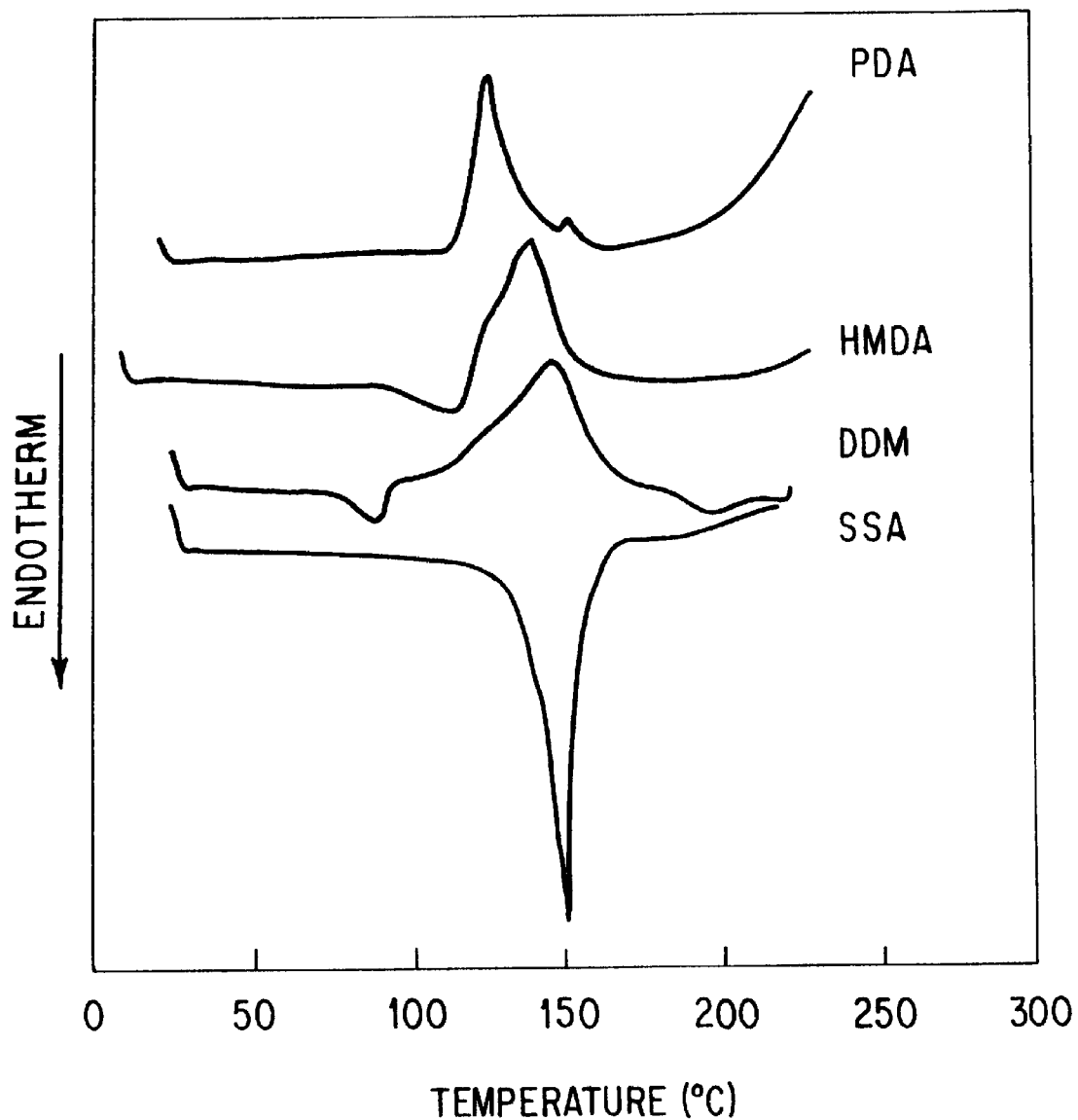
FIG. 4 shows the results of thermal analysis by DSC of epoxy monomer (Twin 8e) mixed with different diamines.

The reactivity of epoxy monomer Twin 8e was examined using four diamine compounds: diaminodiphenylmethane (DDM), p-phenylene diamine (PDA), hexamethylene diamine (HMDA) and sulphanilamide (SAA). The first three diamines are symmetrical compounds in which amine functions have approximately equal reactivity. The latter diamine (SAA) has, however, two different amine functions of unequal reactivity and seems to favor formation of a smectic phase as described below. FIG. 4 shows the DSC scans of Twin 8e mixed with each diamine. PDA reacts with Twin 8e at the lowest temperature of the four diamines. However, exothermic heat flow above 200° C. indicates that additional reaction also occurs when heated to this higher temperature. PDA was so reactive that the network formed quickly and network formation stopped before PDA had completely reacted. Unreacted sites which become trapped at lower curing temperatures can only react above 200° C. when the mobility of the network is increased. On the other hand, HMDA is a comparatively flexible molecule so that there are few unreacted sites in the network even at lower curing temperatures. Even though aliphatic amines are generally more reactive than aromatic amines, it is thought that the reason for PDA reacting at a lower temperature than HMDA is due to the lower solubility of Twin 8e in HMDA than in PDA. Twin 8e reacts with DDM more slowly than with either PDA or HMDA. Although the main curing exotherm of DDM curing occurred at 150° C., which is the melting point of epoxy monomer Twin 8e, the curing reaction had already begun at 120° C. This result indicates that Twin 8e already has good miscibility with DDM. The reaction between Twin 8e and SAA instead occurred quite gradually. The lower reactivity of SAA comes from the low electron density on the nitrogen atom of the sulfonamide group. A summary of the properties of thermoset mixtures of Twin 8e as cured with different diamines is given in Table 2. Reaction temperature, initial phase and properties of the cured networks are listed and should be referred to during the following discussion of Twin 8e.

formed. Monomeric twins often have interdigitated smectic phases. Interdigitation, which could also explain the smaller d-spacing of the crosslinked twins, is unlikely in view of the high crosslink density. The Twin 8e/DDM mixture cured at 175° C. had a glass transition temperature (Tg) near 100° C., but did not possess a crystalline transition point.

Curing of epoxy Twin 8e with PDA and HMDA

Curing studies of the reactant mixture Twin 8e with PDA (Twin 8e/PDA) and the reactant mixture Twin 8e with HMDA (Twin 8e/HMDA) were carried out at temperatures of 140° C. and 175° C., as listed in Table 2. The Twin 8e/PDA mixture and the Twin 8e/HMDA mixture did not exhibit any liquid crystallinity. However, as the crosslinking reaction proceeded, an optical texture with high disclination density appeared in both the Twin 8e/PDA mixture and the Twin 8e/HMDA mixture which was similar to that observed in the Twin 8e/DDM mixture. The cured polymers were examined by WAXD and were confirmed as smectic. The value of d-spacing obtained for the Twin 8e/PDA mixture cured at 175° C. was 39 Å. This again suggests that the molecules were tilted at an angle of about 33° to the layer plane. Consequently, Twin 8e forms the same smectic-like network when it reacts with DDM, PDA and HMDA.

These results were different from the results of the previous studies (Mallon et al, *J. Polym. Sci.: Part A: Polym. Chem.*, vol. 31, 2249 (1993); Carfagna et al, *Macromol.*

TABLE 2

Curing conditions and properties of networks from epoxy Twin 8e

| | | Curing Condition | | | Cured Polymer | | |
|---|---|---|---|---|---|---|---|
| Monomer | Curing Agent | temperature (°C.) | Time | initial state | phase[a] | d-spacing(Å) | Tg (°C.) |
| Twin 8e | DDM | 140 | 6 hrs | isotropic | S | 43 | 98 |
| | | 175 | 4 hrs | isotropic | S | 42 | 100 |
| | | 200 | 1 hrs | isotropic | S | | 104 |
| | SAA | 175 | 8 hrs | isotropic | S | 44 | 99 |
| | | 200 | 4 hrs | isotropic | S | | 99 |
| | PDA | 140 | 4 hrs | isotropic | S | | 79 |
| | | 175 | 30 min | isotropic | S | 39 | 86 |
| | HMDA | 140 | 2 hrs | isotropic | S | | 102 |
| | | 175 | 30 min | isotropic | S | 39 | 107 |

[a]S denotes smectic-like network

Curing of epoxy Twin 8e with DDM

Figure 5A:
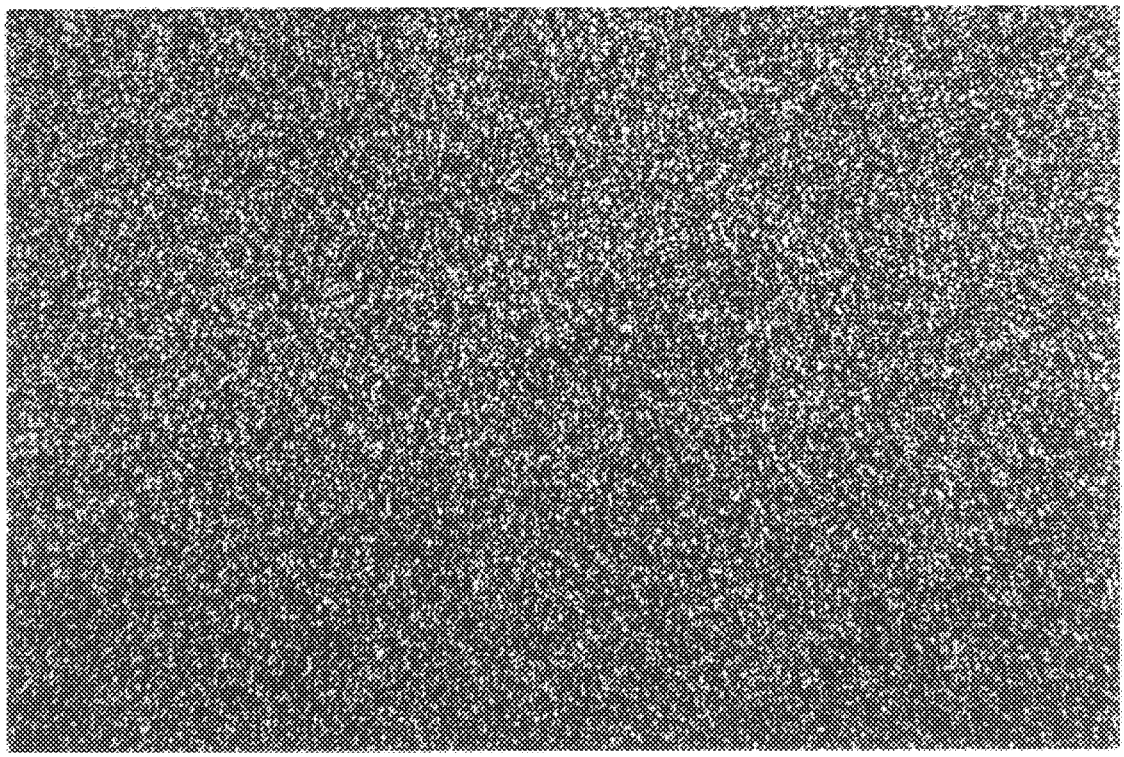
FIGS. 5a and 5b show the optical textures of cured twin epoxy monomer, (a) dense disclination lines in the Twin 8e/DDM system (200X), (b) focal conic textures in the Twin 8e/SAA system (200X)

Using cross-polarized optical microscopy and a Mettler FP-82HF hostage, phase transitions were investigated during the curing process. The initial melt mixture of epoxy monomer Twin 8e and DDM (Twin 8e/DDM) did not show liquid crystallinity at any temperature since it forms an isotropic liquid above the melting point. As the reaction proceeded, the reactant mixture first developed a fluid texture which then became locked-in as the network formed. The cured polymer network retained mesophase birefringence until decomposition. The optical texture obtained from the Twin 8e/DDM mixture is shown in FIG. 5(A). The Twin 8e/DDM mixtures cured at 140° C., 175° C. and 200° C. all had the same occurrence of dense disclination lines ("threaded texture"). X-ray diffraction results indicated that the cured Twin 8e/DDM mixture was also smectic, in contrast to microscopic observation which had suggested a nematic phase. The measured d-spacing for the inner diffraction ring of the Twin 8e/DDM mixture cured at 175° C. was 42 Å, as listed in Table 2. This value was smaller than the calculated repeat distance of 52 Å. Thus, it is believed that the mesogenic groups were tilted at an angle of about 36° to the layer plane and that a smectic C phase was

*Chem. Phys.*, vol. 195, 279 (1994); Carfagna et al, *Macromol. Chem. Phys.*, vol. 195, 2307 (1994)) which examined the reaction of liquid crystal epoxy with a diamine. In these investigations, the diepoxy monomers were cured within the nematic phase, and would typically yield a network with nematic order. In this case, even if the reactant mixture of the LC twin epoxy monomer and a diamine did not exhibit a mesophase or flow birefringence, crosslinking tended to form a smectic-like network. In addition, when using a very reactive curing agent like PDA, when reacted with Twin 8e its mixture still formed a smectic-like network even though the reaction was completed within minutes at 175° C. Previous studies of LC epoxies required a much lower curing rate to form smectic networks (Mallon et al, *J. Polym. Sci.: Part A: Polym. Chem.*, vol. 31, 2249 (1993); Robinson, M. S. Thesis, Cornell University (1994); Jahromi et al, *Polymer*, vol. 35, 622 (1994); Jahromi, *Macromolecules*, vol. 27, 2804 (1994); Jahromi et al, *Macromolecules*, vol. 28, 2201 (1995)). It is believed that the spacer in the twin structure better enabled the mesogens to align parallel to each other, and that the ends of the two mesogens were held at a uniform distance between crosslinking points. Reactant mixtures containing the LC twin epoxies such as monomer Twin 8e therefore possess an intrinsic tendency to form a smectic network when reacted with diamine.

Curing of epoxy Twin 8e with SAA

Figure 5B:
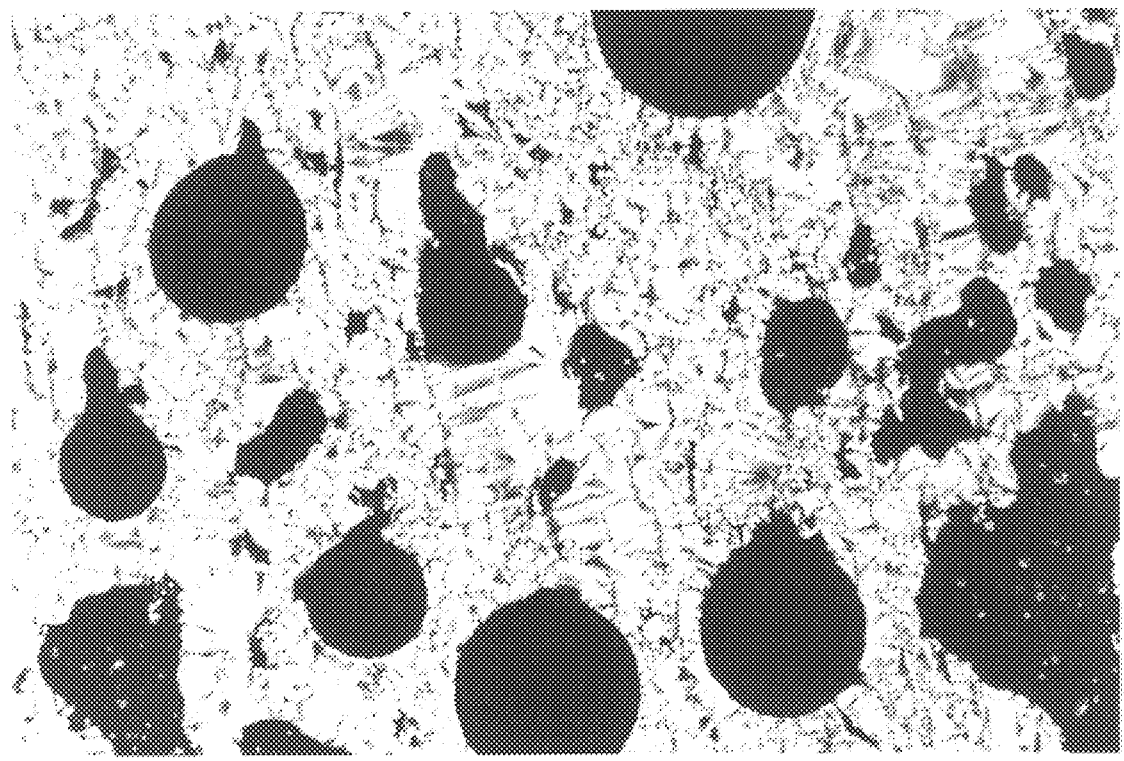
Figure 6:
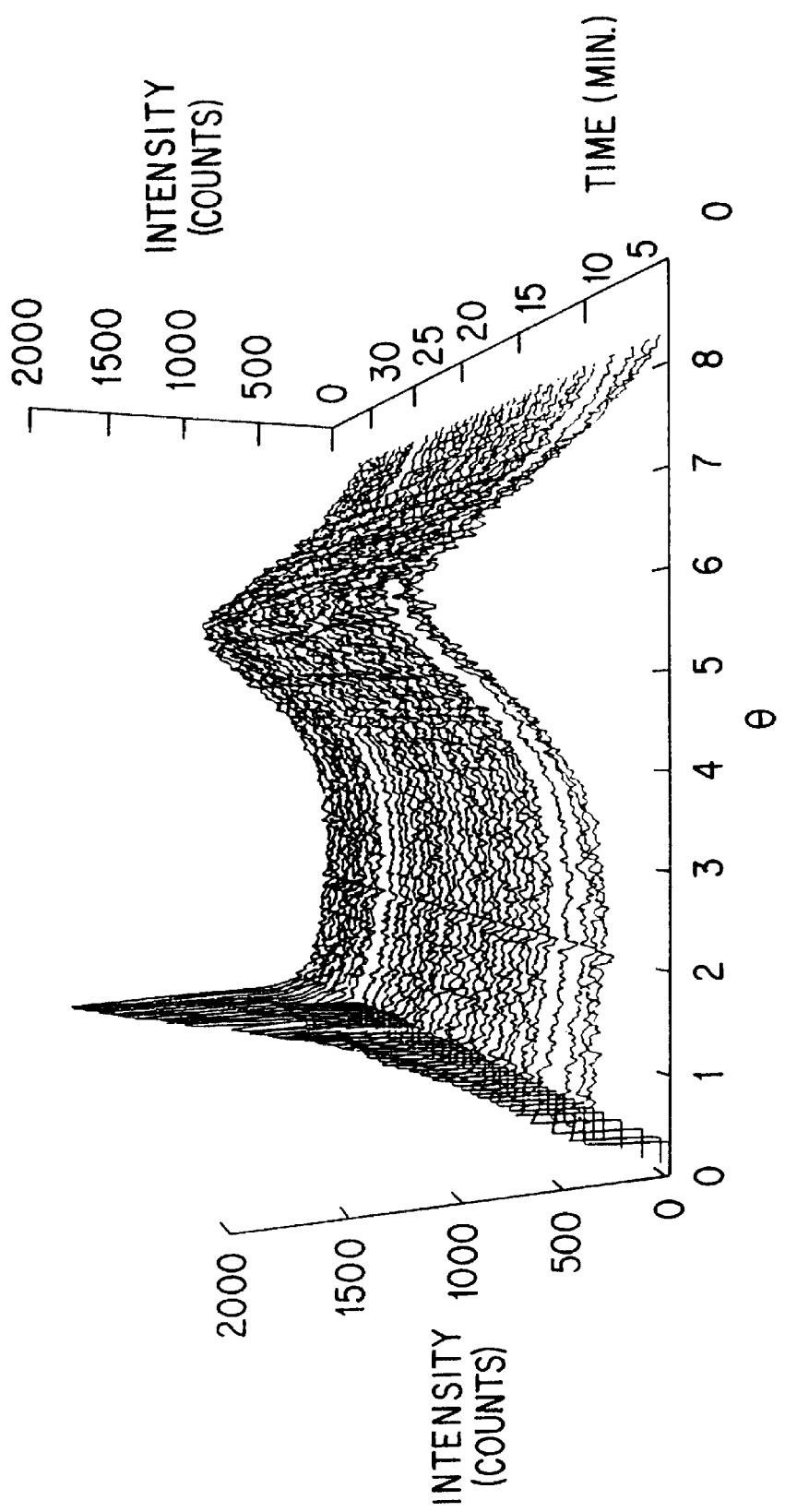
FIG. 6 shows a wide angle X-ray diffraction for the Twin 8e/SAA system as a function of reaction time.

The crosslinking behavior of Twin 8e with SAA was completely different from that with the other diamines. This seems to result from the difference in reactivity of the amine function and that of the sulfonamide function of SAA. A curing study was carried out at 175° C. with POM, the results of which are listed in Table 2. The uncured reactant mixture Twin 8e and SAA (Twin 8e/SAA) was not initially birefringent. Approximately 5 minutes after the start of the reaction, a Maltese cross pattern emerged. The number of Maltese crosses increased gradually, and then they formed a focal conic texture associated with a smectic phase. Eventually, the focal conic texture was frozen by network formation after 20 minutes of curing [see FIG. 5(B)]. A curing study at 200° C. with POM gave the same result. Time resolved X-ray diffraction studies shown in FIG. 6 are in good agreement with optical microscopy with regard to the method of formation of a smectic phase. In this figure, the diffraction pattern is plotted as a function of time for the first 30 minutes of the curing reaction. The growth of the inner ring as the smectic phase forms can be easily observed. In contrast to studies of the growth of the smectic phase from an isotropic melt of a side chain LC polymer (Galli et al, *J. Polym. Sci.: Polym. Phys. Ed.*, vol. 31, 773–777 (1993)), the smectic layer peak showed no change in full width at half maximum as the curing reaction proceeds, indicating little enlargement of the smectic regions. This conclusion for diffraction data is consistent with the observation by microscopy of continuous nucleation as curing occurs. It is thought that both the difference in reactivity between the amine and sulfonamide groups enables the build-up of linear sections which form a highly ordered smectic phase prior to linking while the lower reaction rate of epoxy Twin 8e with SAA enables more time for organization to occur at these high temperatures.

Figure 7:
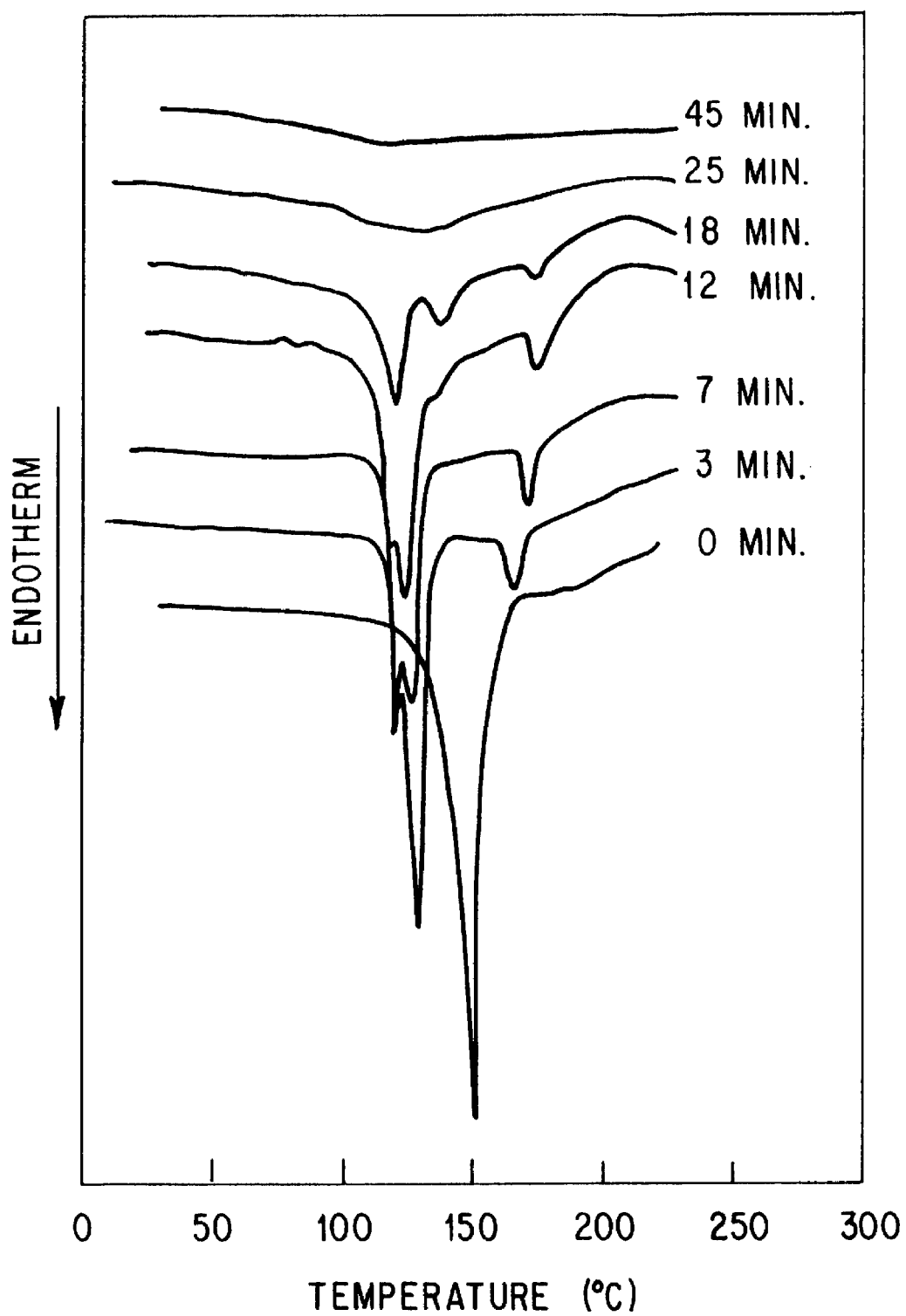
FIG. 7 shows the results of a cure study of the Twin 8e/SAA system processed at 175° C.

A study of curing made with DSC was likewise carried out in order to obtain more detailed information about the curing process. The DSC curing studies of the Twin 8e/SAA mixture were conducted as follows: solvent-free stoichiometric mixtures of Twin 8e/SAA were placed into a series of sealed aluminum DSC pans, and then cured in a hostage at 175° C. for varying lengths of time. The pans were removed from the hostage and subjected to DSC scans from 25° to 230° C. at a heating rate of 10° C./min. Each of these DSC scans is shown in FIG. 7. The DSC scan of the Twin 8e/SAA mixture before curing displayed a sharp crystalline-isotropic transition at a temperature of 150° C. No mesophase was apparent in the uncured Twin 8e/SAA mixture. Three minutes after the start of curing, two transitions appeared at temperatures of 127° C. and 174° C. The transition at 127° C. was identified as a crystalline-smectic transition.

A batônnet texture corresponding to smectic organization was observed by optical microscopy. There was also flow birefringence from 127° to 174° C. when pressure was applied to the cover slip which disappeared immediately when pressure was removed. During the initial stage of this reaction, the Twin 8e/SAA mixture had a smectic-isotropic biphase between 127° and 174° C. The endothermic peak at 174° C. was a smectic-isotropic transition as confirmed by POM. The smectic-isotropic transition temperature increased gradually as the reaction advanced. Twelve minutes after the start of curing, another endothermic peak appeared at 140° C. No apparent change was detected around 140° C. using POM. However, a microgel in the smectic liquid was observed as small particles that eventually coalesced. The formation of microgel was associated with an endothermic peak around 140° C. that disappeared at higher conversion. After 25 minutes of curing, only a Tg was observed at ca. 100° C. in the DSC trace of the birefringent solid. The d-spacing of the smectic layer as measured by WAXD was 44 Å. This suggests that these molecules are tilted at an angle of about 10° to the layer plane and that a smectic C phase was again formed. The tilt angle estimated in this case was smaller than the tilt angle of cured Twin 8e/DDM or Twin 8e/PDA. Again, this cannot be explained by interdigitation.

In the initial stage of the reaction, linear chain oligomers are created by the reaction of the epoxy monomer Twin 8e and sulfonamide site of SAA. These oligomers play an important role in constructing macroscopic smectic order, and it can be inferred that crosslinking sites around the nitrogen atom on these amines are less strained as revealed by the presence of relatively well-formed focal conic textures during the reaction.

Curing of epoxy Twin 9e with DDM, PDA and SAA

Figure 8:
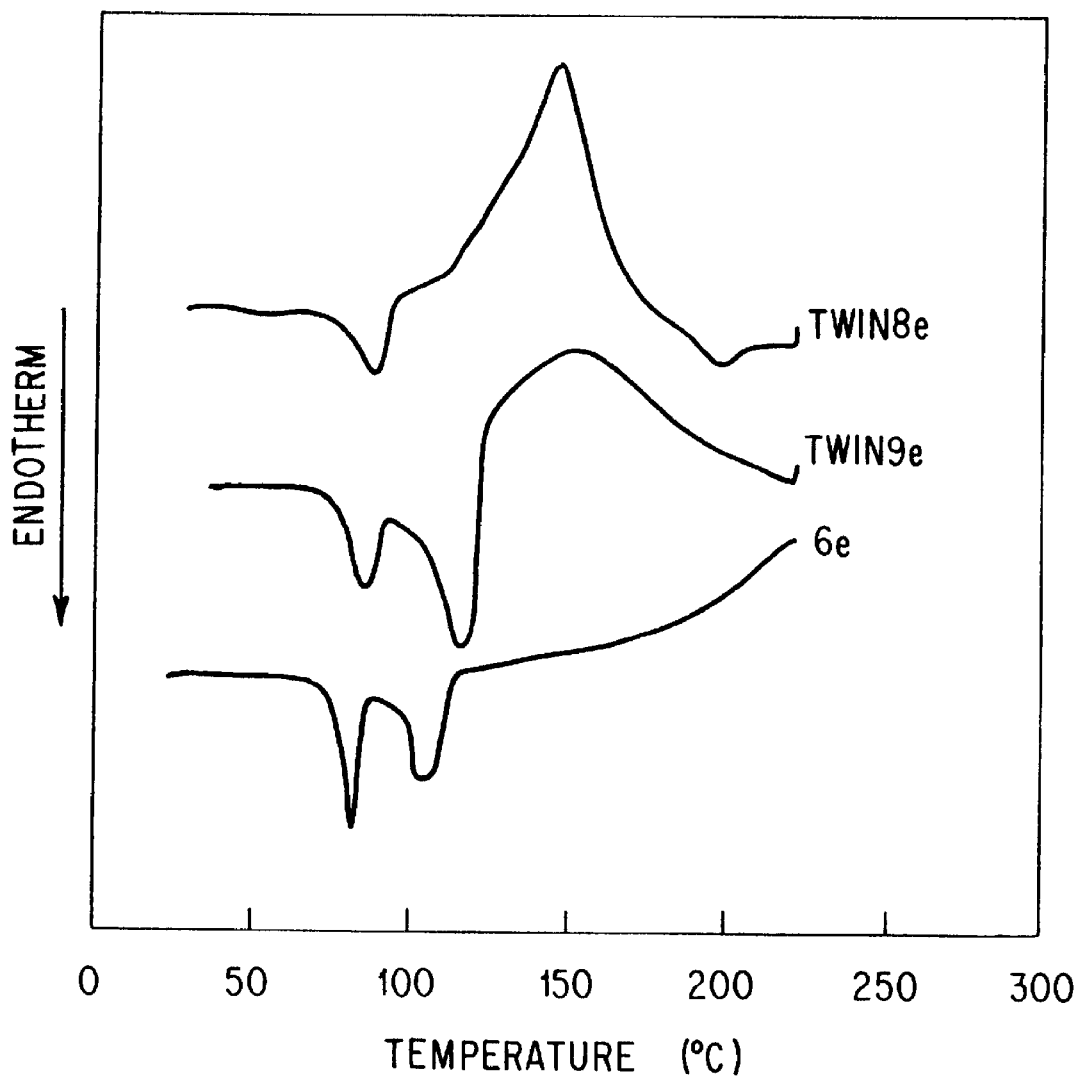
FIG. 8 shows a DSC scan of epoxy monomers mixed with a stoichiometric amount of DDM.
Figure 9:
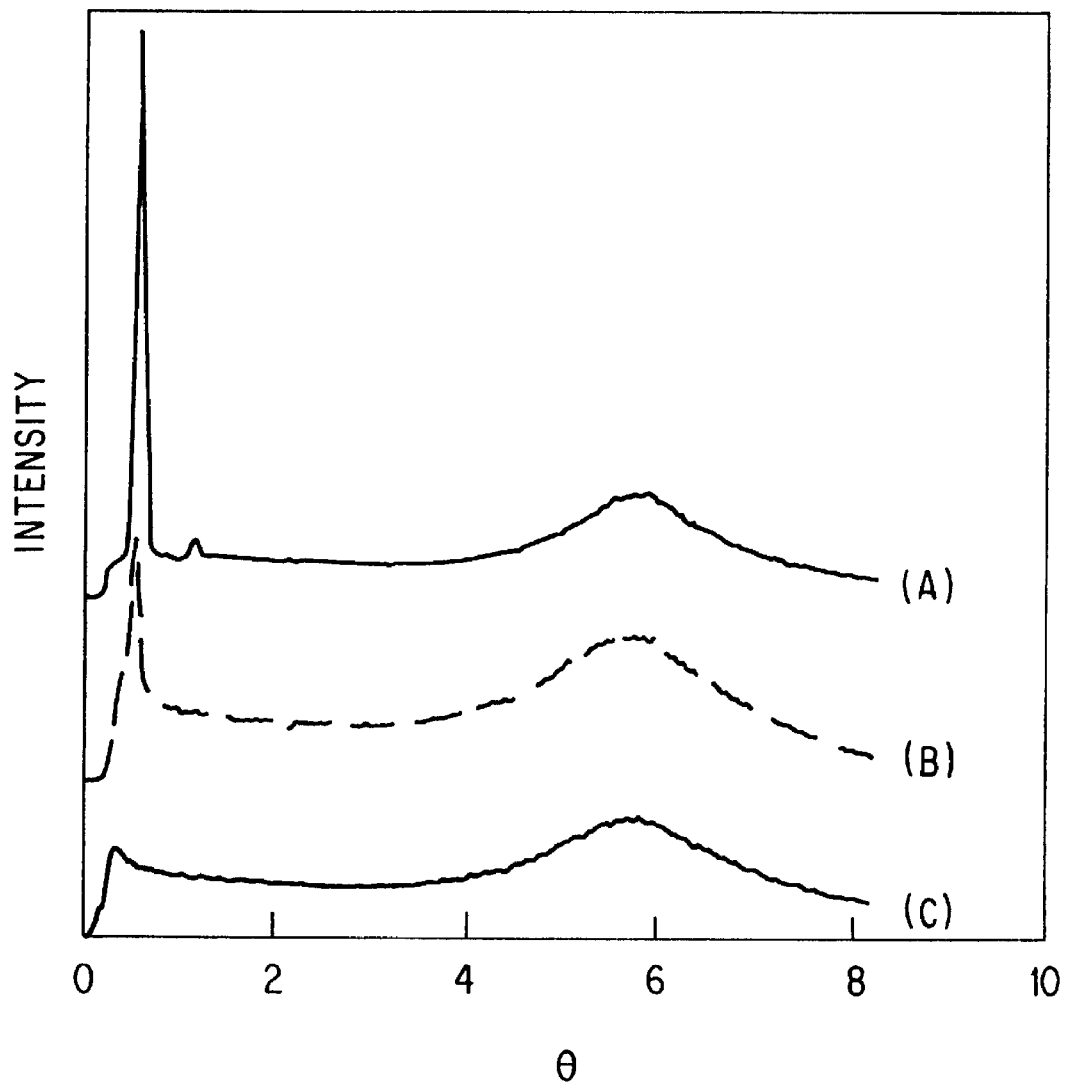
FIG. 9 shows a wide angle X-ray diffraction of (A) Twin 9e/DDM cured at 140° C. for 15 minutes, (B) Twin 8e/SAA cured at 175° C. for 25 minutes, (C) 6e/DDM cured at 175° C. for 25 minutes.

Since LC twins exhibit an even-odd effect, a second twin epoxy with an odd spacer was also studied. Reaction conditions and properties for the cured networks of Twin 9e are given in Table 3. FIG. 8 displays the DSC scans of reactant mixtures of the epoxy monomer and DDM. It was observed that epoxy Twin 9e was less reactive with DDM than was epoxy Twin 8e even though Twin 9e possessed the lower melting point and better solubility. The reactant mixture of Twin 9e and DDM was not birefringent during the initial stage of curing at any temperature above melting point. The Twin 9e/DDM mixture, when cured at 175° C. for 4 hours, showed some birefringence which is believed to be due to a stressed isotropic solid. On the other hand, the Twin 9e/DDM mixture cured at 140° C. exhibited dense disclination lines which were also observed in the cured Twin 8e/DDM mixture, and had smectic order as corroborated by WAXD (see FIG. 9). In the Twin 9e/DDM cure system, changes in curing temperature lead to different network structures, with smectic-like or isotropic organization. When the thermoset was formed below 155° C., a reactant mixture of the Twin 9e/DDM formed a smectic-like network. However, when curing was carried out above 155° C., the mixture produced an isotropic network. Above 155° C., the crosslinking reaction was so fast that the network was evidently unable to organize as well as at lower temperature.

Figure 11B:
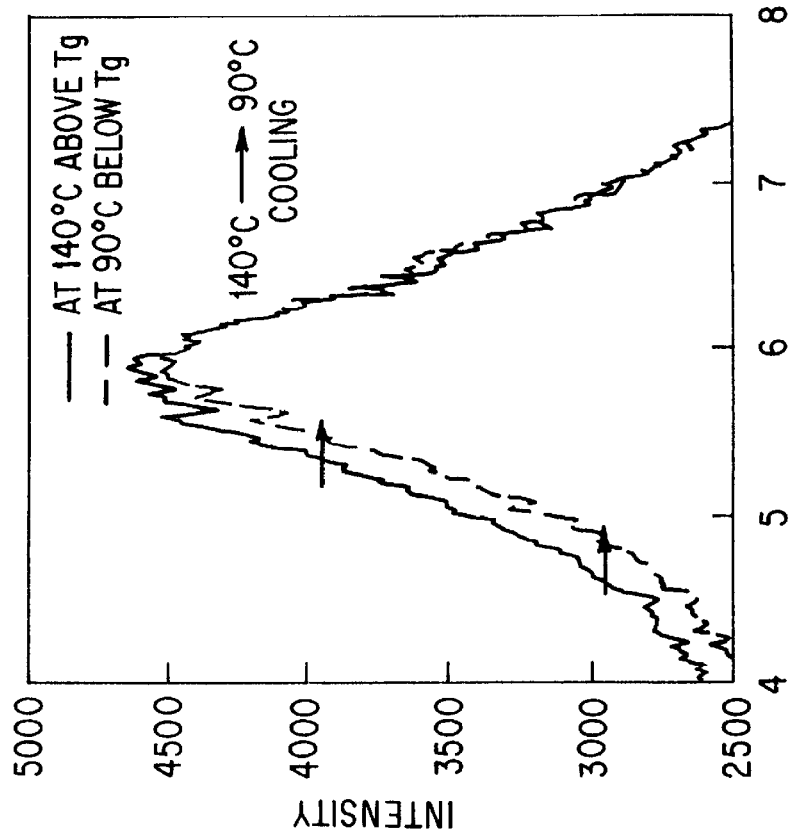
FIGS. 11a and 11b show the evolution of X-ray Diffraction Spectra upon cooling from above Tg (140° C.) to below Tg (90° C.). Twin 9e/DDM was processed at 140° C. for 16 minutes before cooling down.
Figure 11A:
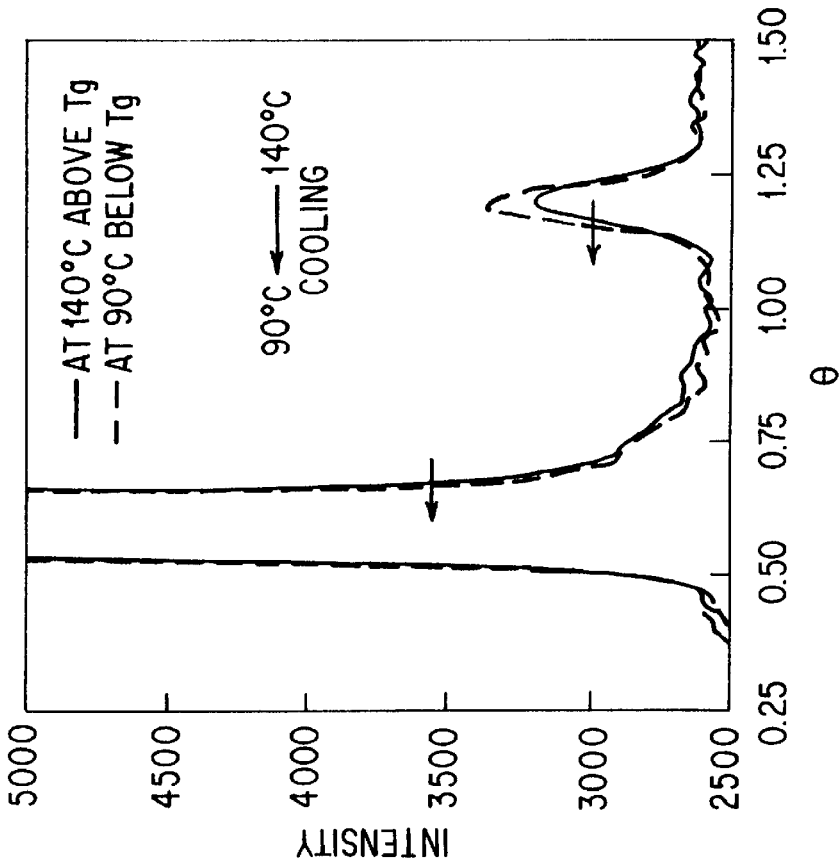

In densely crosslinked LC twin networks, the X-ray diffraction patterns measured both above and below Tg were nearly identical. The differences in X-ray diffraction specific upon cooling from above Tg (140° C.) to below Tg (90° C.) were followed by real time X-ray diffraction (see FIG. 11). Cooling lead to a small decrease in spacing between chains and a slight, simultaneous increase in spacing between layers. Such small changes mean that the smectic structure is frozen in the cured network, but will adjust slightly to temperature changes.

Figure 10:
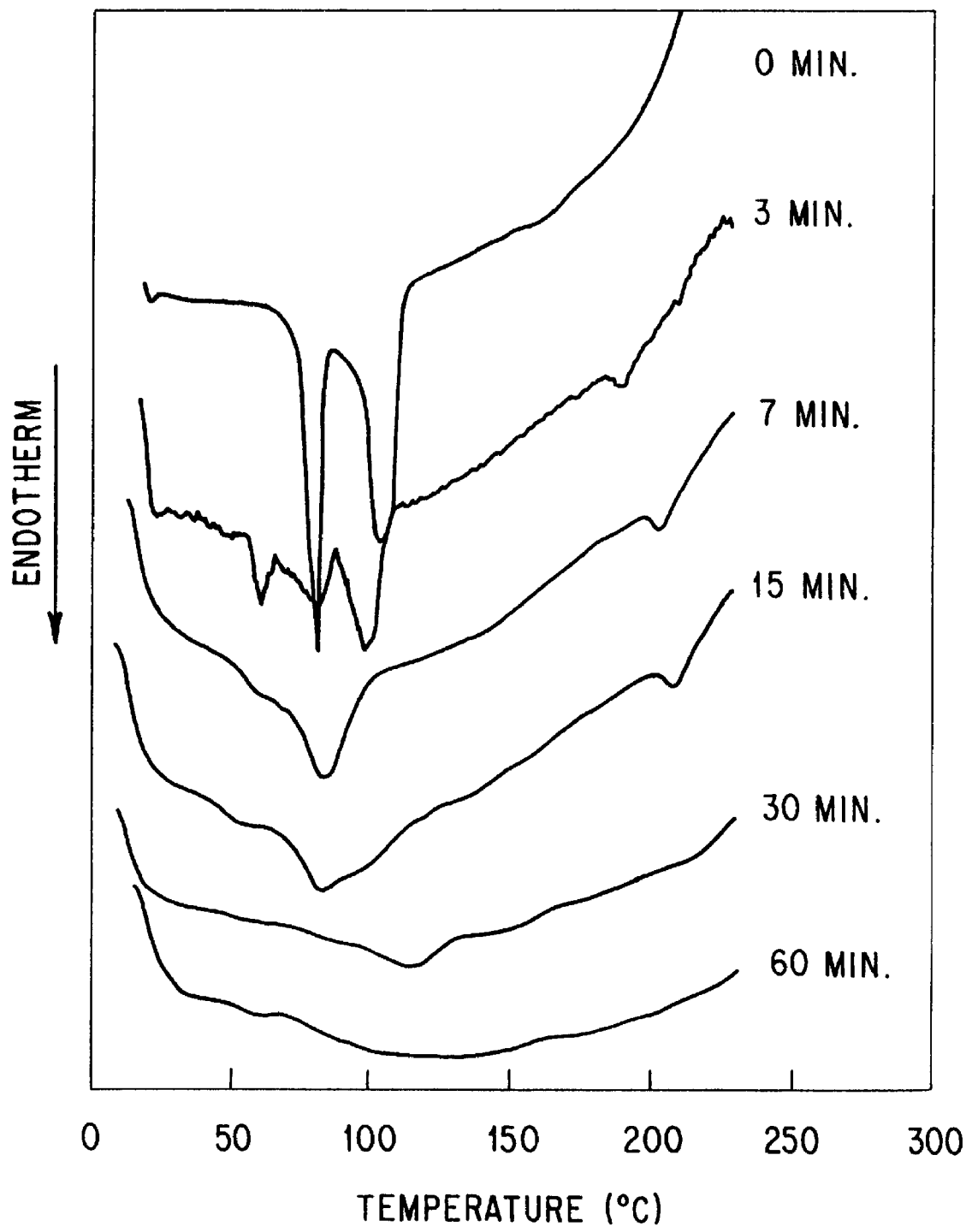
FIG. 10 shows the results of a cure study of 6e/DDM system processed at 140° C.

Using SAA as curing agent instead of DDM, the reactant mixture of the epoxy monomer Twin 9e exhibited a batônnet texture. This smectic-like order occurred 15 minutes after the start of curing at 175° C. At this temperature during the initial stage of curing, only an isotropic liquid was observed. The lower reactivity of SAA gives the reactant mixture of Twin 9e/SAA enough time to organize an ordered structure even if it was cured under conditions where the Twin 9e/DDM mixture did not form a smectic order. The difference in reactivity between the amine and sulfonamide groups also helped to form a smectic-like order in the Twin 9e/SAA mixture at high curing temperature. The same arguments previously discussed for the reaction of the Twin 8e/SAA mixture favoring smectic ordering are also valid for the Twin 9e/SAA mixture. The d-spacing for the smectic layer of the Twin 9e/SAA network was also measured by WAXD. The measured value of 38 Å was smaller than that obtained for either Twin 9e/DDM or the value obtained for the Twin 8e/SAA mixture.

curing study was carried out at a temperature of 140° C. with DSC [see FIG. 10]. The 6e/DDM mixture when heated rapidly had a weak nematic-isotropic transition at 170° C. by DSC before curing (cure time: 0 min.) A clearing temperature was also observed at 168° C. by POM. The nematic-isotropic transition point had increased to 210° C. after 15 minutes of curing. In the middle stage of the curing process (cure time: 7 to 15 minutes), a crystalline-nematic transition point was observed around 85° C. After 60 minutes of curing, no crystallinity was observed and Tg now appeared at this temperature. It was observed that the nematic phase was stable for the 6e/DDM mixture during the curing process, and a smectic phase never developed as the network formed.

TABLE 3

Curing conditions and properties of networks from epoxy Twin 9e

| Monomer | Curing Agent | Curing Condition | | | Cured Polymer | | |
|---|---|---|---|---|---|---|---|
| | | temperature (°C.) | Time | initial state | phase[a] | d-spacing(Å) | Tg (°C.) |
| Twin 9e | DDM | 140 | 6 hrs | isotropic | S | 40 | 97 |
| | | 175 | 4 hrs | isotropic | I | | 108 |
| | SAA | 175 | 8 hrs | isotropic | S | 38 | 106 |
| | PDA | 140 | 4 hrs | isotropic | S | 39 | 91 |
| | | 175 | 30 min | isotropic | I | | 82 |

[a]S and I denote smectic-like network and isotropic network respectively

The mixture of epoxy Twin 9e and PDA (Twin 9e/PDA) displayed the same behavior as the Twin 9e/DDM mixture, but the reaction was even faster than that of the Twin 9e/DDM mixture. A Twin 9e/PDA mixture which was cured at 140° C. for 4 hours did exhibit smectic-like order as confirmed by WAXD.

Curing of Single Mesogen Epoxy (6e) with DDM

An investigation of a single mesogen epoxy with spacers connecting the crosslink groups was undertaken to compare this class of thermoset with the LC epoxy twins. The curing process of 6e, therefore, with DDM, PDA and SAA was examined. Reaction conditions and properties of the cured networks are given in Table 4. While not comprehensive, this investigation did uncover some general differences. Previous studies of compounds similar to 6e have been reported by S. Jahromi (Jahromi et al, *Polymer*, vol. 35, 622 (1994); Jahromi, *Macromolecules*, vol. 27, 2804 (1994); Jahromi et al, *Macromolecules*, vol. 28, 2201 (1995)) and J. J. Mallon et al (Mallon et al, *J. Polym. Sci.: Part A: Polym. Chem.*, vol. 31, 2249 (1993)). Jahromi used 4-[2-(glycidyl methoxy)ethoxy]-benzoic acid 1,4-phenylene ester as the diepoxide and diaminobiphenyl as the curing agent. Mallon studied the reaction of 4-(8-oxiranyloctyloxy)benzoic acid 1,4-phenylene ester and PDA.

As shown in FIG. 8, the reactivity of epoxy 6e was much lower than Twin 8e or Twin 9e. This comes from the difference in reactivity of epoxy functions attached at the end of a long alkyl chain as in 6e and the epoxy functions attached to the aromatic ring as in Twin 8e and Twin 9e. Curing studies of the 6e reactant mixture with DDM (6e/DDM) were performed at both 140° C. and 175° C. At the beginning of curing, the 6e/DDM mixture showed a marble texture at 140° C., which corresponded to a nematic phase. As the crosslinking reaction proceeded, the marble texture was frozen into the network [see FIG. 9]. WAXD measurement confirmed that the polymer network was nematic. A At 175° C. the 6e/DDM mixture produced an isotropic liquid as shown in FIG. 7. Eight minutes after the start of curing, a marble texture associated with a nematic phase emerged and spread quickly to cover the entire area observed by POM. After 13 minutes of curing, this nematic liquid became a rubbery nematic-like network even though it was initially cured starting from the isotropic state.

The curing reaction of 6e and PDA (6e/PDA) was examined for comparison with previous studies (Mallon et al, *J. Polym. Sci.: Part A: Polym. Chem.*, vol. 31, 2249 (1993); Jahromi et al, *Polymer*, vol. 35, 622 (1994); Jahromi, *Macromolecules*, vol. 27, 2804 (1994); Jahromi et al, *Macromolecules*, vol. 28, 2201 (1995)) which reported that smectic order existed in the final network. The present studies agreed with the reported results, provided that curing was done at a temperature just above the melting point of the reactant mixture, for example at 120° C. When the 6e/PDA mixture was cured at 150° C., the cured network polymer displayed nematic-like organization as determined by POM and X-ray analysis.

Epoxy 6e was also investigated using SAA as a crosslinking agent. Epoxy 6e and SAA (6e/SAA) formed an isotropic liquid at 175° C. prior to curing, but after 15 minutes of curing, it was observed using POM that relatively large Maltese cross patterns emerged. This observation is ascribed to an isotropic-smectic biphase in the 6e/SAA mixture. As the curing reaction proceeded, the Maltese cross pattern disappeared and many small regions of a birefringent phase formed. WAXD studies of 6e/SAA cured at 175° C. for 4 hours showed only a diffuse diffraction ring with a d-spacing of 4.5 Å characteristic of a nematic mesophase. Therefore, by the intermediate stage of the reaction, enough oligomers had been generated to form a smectic mesophase. However, as the network density increased, smectic order was reduced, and a nematic-like network formed.

TABLE 4

Curing conditions and properties of networks from epoxy 6e

| Monomer | Curing Agent | Curing Condition | | | Cured Polymer | | |
|---------|--------------|------------------|------|---------------|--------|-------------|---------|
| | | temperature (°C.) | Time | initial state | phase[a] | d-spacing(Å) | Tg (°C.) |
| 6e | DDM | 140 | 6 hrs | nematic | N | | 102 |
| | | 175 | 4 hrs | isotropic | N | | 122 |
| | SAA | 175 | 8 hrs | isotropic | N | | 107 |
| | PDA | 120 | 4 hrs | nematic | S | 26 | Tm = 136 |
| | | 150 | 4 hrs | nematic | N | | 106 |

[a] S and N denote smectic-like network and nematic-like network respectively

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A compound of the formula (I):

where

is a mesogen,

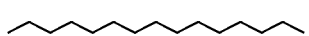

is a spacer, and —X is an epoxy-containing group, and wherein the spacer is selected from the group consisting of

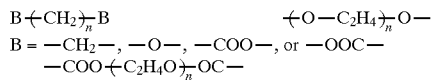

and

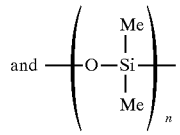

wherein n=2–20.

2. The compound of claim 1, wherein said mesogen is selected from the group consisting of

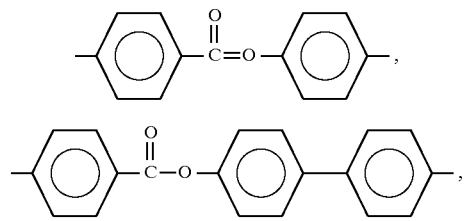

-continued

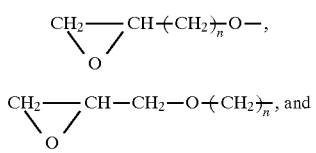

3. The compound of claim 1, wherein said epoxy-containing group is selected from the group consisting of $$CH_2\!\!-\!\!\!\underset{O}{\diagdown\!\!\diagup}\!\!-\!\!CH\!\!-\!\!(CH_2)_n\!\!-\!\!O\!\!-,$$

$$CH_2\!\!-\!\!\!\underset{O}{\diagdown\!\!\diagup}\!\!-\!\!CH\!\!-\!\!CH_2\!\!-\!\!O\!\!-\!\!(CH_2)_n\!\!-\!\!, \text{ and}$$

-continued $$CH_2\underset{O}{-}CH-CH_2-O-(CH_2-CH_2-O)_{\overline{n}}\text{ wherein}$$

wherein n=1–10.

4. A polymer, prepared by curing a mixture of
(a) compound of formula (I):

X—▭〰〰〰〰〰▭—X where

▭ is a mesogen,

〰〰〰〰 is a spacer, and —X is an epoxy-containing group, and wherein the spacer is selected from the group consisting of B$+$CH$_2)_{\overline{n}}$B  $+$O—C$_2$H$_4)_{\overline{n}}$O—
B = —CH$_2$—, —O—, —COO—, or —OOC—
—COO$+$C$_2$H$_4$O$)_{\overline{n}}$OC—

B$+$CF$_2)_{\overline{n}}$B
B = —CF$_2$—, —O—, —COO—, or —OOC— and $\left(\begin{array}{c}\text{Me}\\|\\-\text{O}-\text{Si}-\\|\\\text{Me}\end{array}\right)_n$ wherein n=2–20 and (b) a crosslinking agent.

5. The polymer of claim 4, wherein said mesogen is selected from the group consisting of

-⌬-C(=O)-O-⌬-,

-⌬-C(=O)-O-⌬-⌬-,

-⌬-C(Me)=C-⌬-,

-⌬-C(=O)-O-⌬-O-C(=O)-⌬-,

-⌬-C=C-⌬-,

-⌬-O-C(=O)-⌬-C(=O)-O-⌬-,

-⌬-C=N-⌬-,

-⌬-C(=O)-O-⌬-C(=O)-O-⌬-,

-⌬-N=N-⌬-,

-⌬-⌬-, and

-⌬-N(→O)=N-⌬-.

6. The polymer of claim 4, wherein said epoxy-containing group is selected from the group consisting of $CH_2\underset{O}{-}CH+CH_2)_{\overline{n}}O-$, $CH_2\underset{O}{-}CH-CH_2-O+CH_2)_{\overline{n}}$, and $CH_2\underset{O}{-}CH-CH_2-O+CH_2-CH_2-O)_{\overline{n}}$ wherein n=1–10.

7. The polymer of claim 4, wherein said crosslinking agent is selected from the group consisting of diamine compounds and diamine/monoamine mixtures.

8. The polymer of claim 4, wherein said crosslinking agent is a diamine compound.

9. The polymer of claim 4, wherein said crosslinking agent is selected from the group consisting of

H$_2$N-⌬-NH$_2$,

H$_2$N-⌬-S(=O)$_2$-NH$_2$,

H$_2$N-⌬-⌬-NH$_2$,

H$_2$N-⌬-CONH$_2$,

H$_2$N-⌬-CH$_2$-⌬-NH$_2$,

H$_2$N-⌬-|-⌬-NH$_2$, and

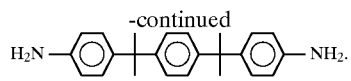

10. The polymer of claim 4, wherein said mesogen is selected from the group consisting of

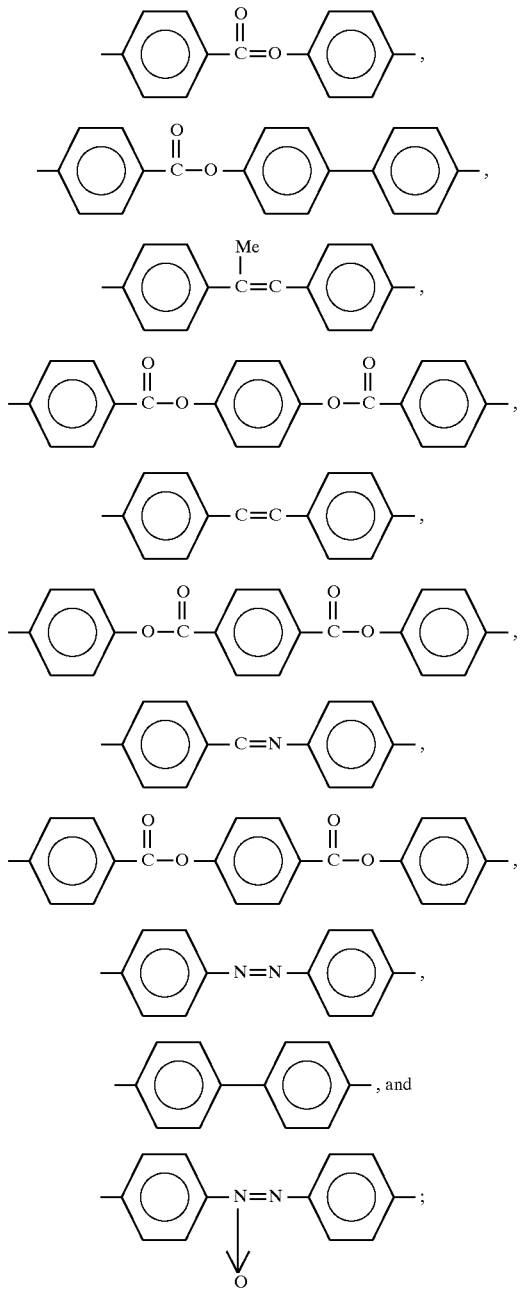

wherein said spacer is selected from the group consisting of

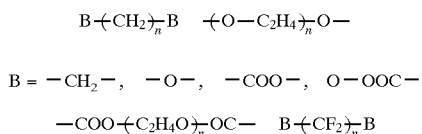

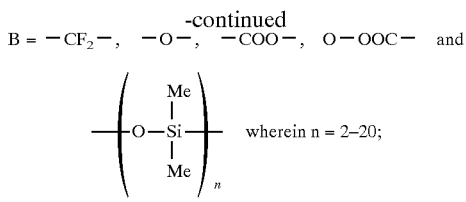

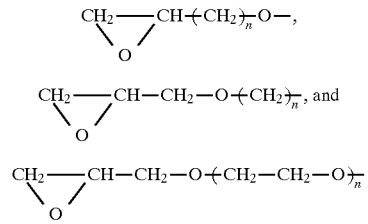

wherein said epoxy-containing group is selected from the group consisting of

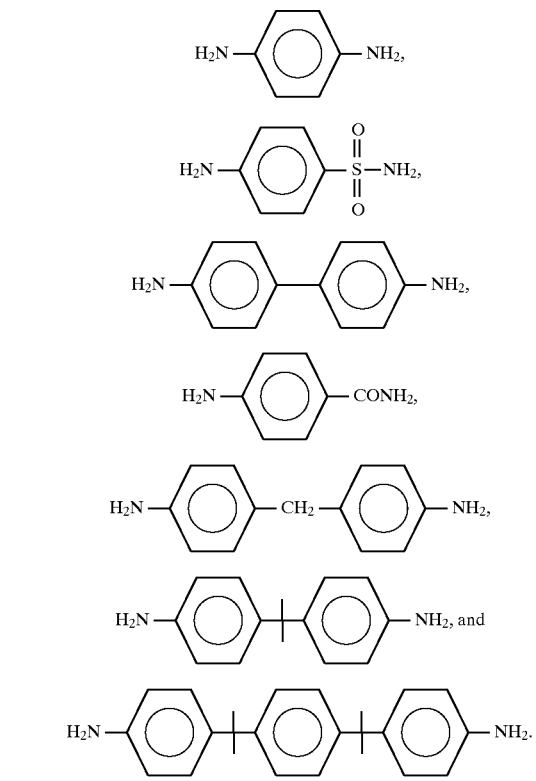

wherein n=1–10; and wherein said crosslinking agent is selected from the group consisting of

11. The polymer of claim 4, which is a smectic network.

12. A process for preparing a polymer, said process comprising (a) reacting a compound of formula (I):

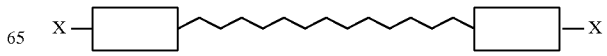

where

is a mesogen,

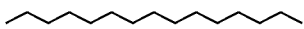

is a spacer, and —X is an epoxy-containing group, and wherein the spacer is selected from the group consisting of

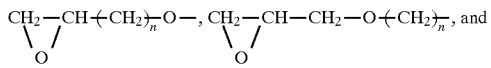

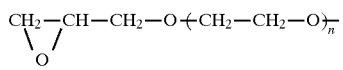

wherein n=2–20, with
(b) a crosslinking agent.

13. The process of claim 12, wherein said epoxy-containing group is selected from the group consisting of wherein n=1–10.

14. The process of claim 12, wherein said mesogen is selected from the group consisting of

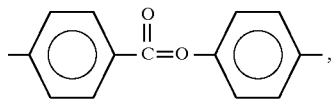

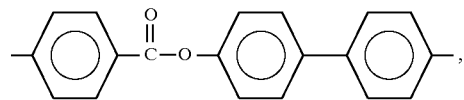

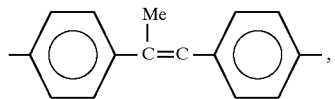

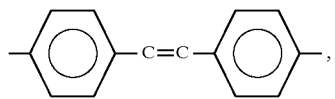

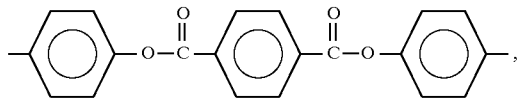

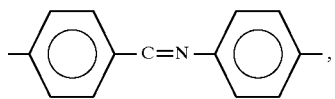

-continued

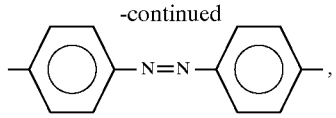

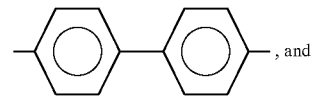

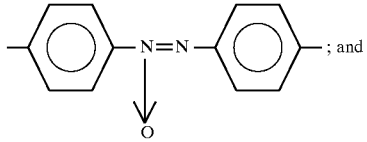

wherein said spacer is selected from the group consisting of

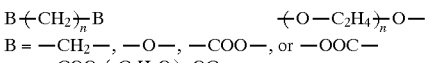
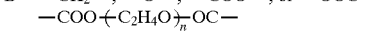
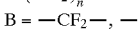
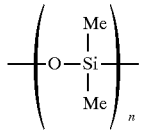

wherein n=2–20.

15. The process of claim 12, wherein said crosslinking agent is selected from the group consisting of diamine compounds and diamine/monoamine mixtures.

16. The process of claim 12, wherein said crosslinking agent is a diamine compound.

17. The process of claim 12, wherein said crosslinking agent is selected from the group consisting of

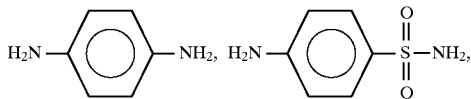

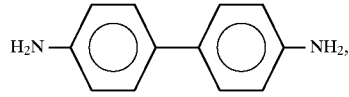

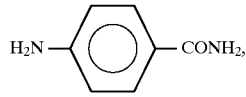

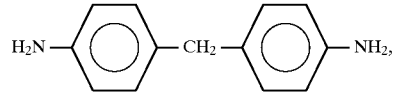

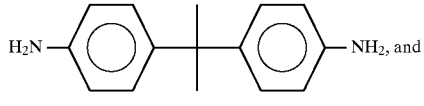

18. The process of claim 12, wherein said crosslinking agent is selected from the group consisting of

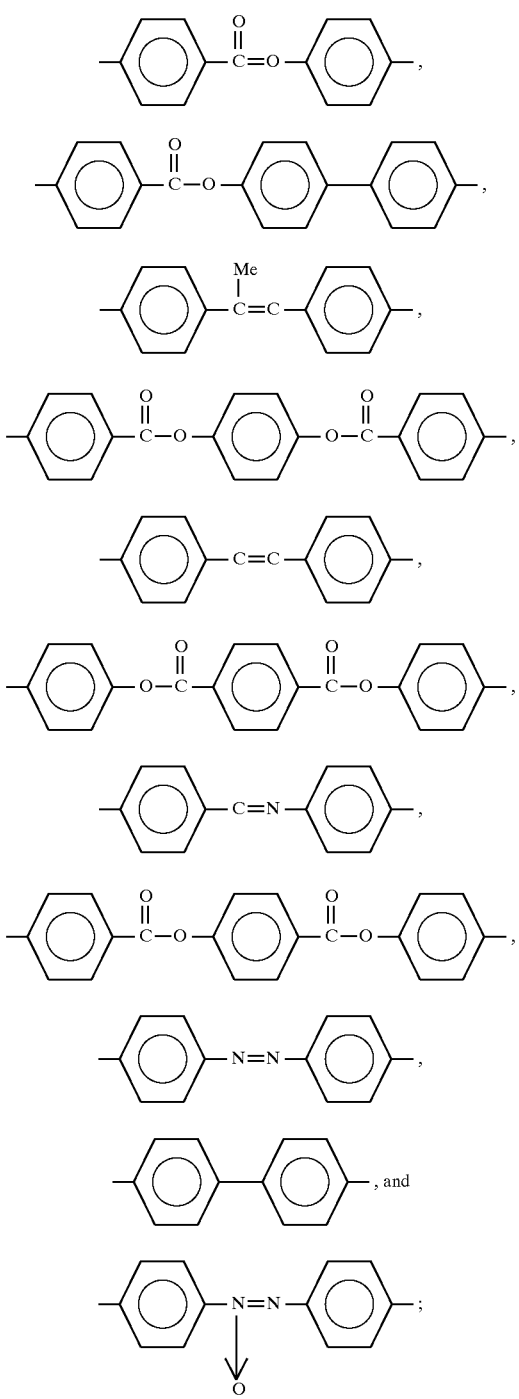
wherein said spacer is selected from the group consisting of
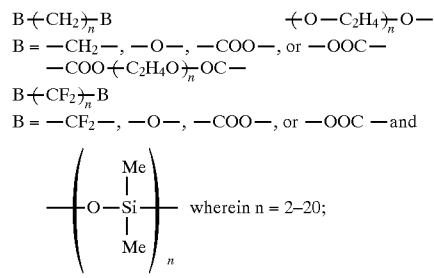
wherein said epoxy-containing group is selected from the group consisting of
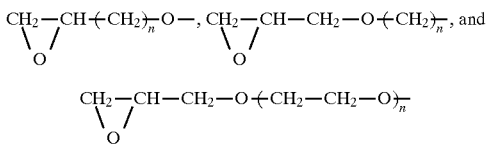
wherein n=1–10; and
wherein said crosslinking agent is selected from the group consisting of
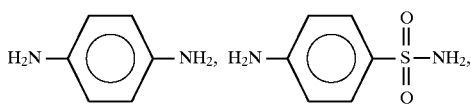
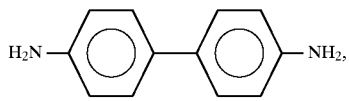
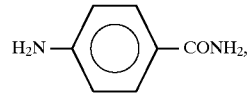
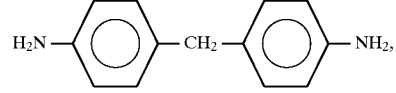
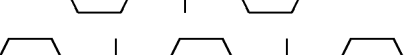
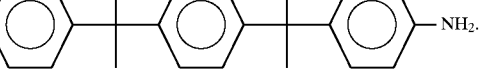
19. The process of claim 12, wherein said polymer is a smectic network.
* * * * *